US010637552B2

(12) United States Patent
Miyamoto et al.

(10) Patent No.: US 10,637,552 B2
(45) Date of Patent: Apr. 28, 2020

(54) RADIO APPARATUS AND RADIO COMMUNICATION METHOD

(71) Applicant: NIPPON TELEGRAPH AND TELEPHONE CORPORATION, Tokyo (JP)

(72) Inventors: Kenji Miyamoto, Yokosuka (JP); Jun Terada, Yokosuka (JP); Tatsuya Shimizu, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/344,302

(22) PCT Filed: Nov. 6, 2017

(86) PCT No.: PCT/JP2017/039888
§ 371 (c)(1),
(2) Date: Apr. 23, 2019

(87) PCT Pub. No.: WO2018/088346
PCT Pub. Date: May 17, 2018

(65) Prior Publication Data
US 2019/0273539 A1    Sep. 5, 2019

(30) Foreign Application Priority Data
Nov. 11, 2016 (JP) ................. 2016-220750

(51) Int. Cl.
*H04B 7/06* (2006.01)
*H04B 17/318* (2015.01)
(Continued)

(52) U.S. Cl.
CPC ............. *H04B 7/063* (2013.01); *H04B 7/022* (2013.01); *H04B 17/318* (2015.01);
(Continued)

(58) Field of Classification Search
CPC .. H04B 7/0632; H04B 17/336; H04B 17/309; H04B 17/318
See application file for complete search history.

(56) References Cited

U.S. PATENT DOCUMENTS

2006/0227854 A1* 10/2006 McCloud ............. H04B 1/1027
375/148
2012/0278043 A1* 11/2012 Lewis ...................... G01D 1/00
702/189

FOREIGN PATENT DOCUMENTS

JP     2010-504682 A    2/2010
WO    WO-2008/038879 A1    4/2008

OTHER PUBLICATIONS

Yasuhiko Matsunaga, Radio Access Network Architecture Evolution toward 5G, IEICE Technical Report, vol. 114, No. 254, RCS2014-172, pp. 89-94, Oct. 2014.
(Continued)

*Primary Examiner* — Kevin Kim
(74) *Attorney, Agent, or Firm* — Harness, Dickey & Pierce, P.L.C.

(57) ABSTRACT

A radio apparatus in a radio communication system that includes the radio apparatus and a signal processing apparatus that function as a base station, includes a channel estimation unit that, on the basis of a radio signal transmitted from a terminal apparatus, measures a reception quality of the radio signal; and a transmission control unit that, on the basis of the reception quality measured by the channel estimation unit, controls transmission, to the signal processing apparatus, of bit data or a log likelihood ratio obtained from the radio signal.

3 Claims, 20 Drawing Sheets

(51) Int. Cl.
   *H04B 17/336* (2015.01)
   *H04B 7/022* (2017.01)
   *H04W 28/16* (2009.01)
   *H04W 92/12* (2009.01)
   *H04L 27/00* (2006.01)
   *H04W 88/08* (2009.01)

(52) U.S. Cl.
   CPC .......... *H04B 17/336* (2015.01); *H04L 27/00* (2013.01); *H04W 28/16* (2013.01); *H04W 88/08* (2013.01); *H04W 92/12* (2013.01)

(56) References Cited

OTHER PUBLICATIONS

Kenji Miyamoto et al., Proposal on Functional-Split Scheme of Base Stations for Future Radio Access, IEICE Technical Report, CS2015-15, pp. 33-38, Jul. 2015.

Tomoaki Ohtsuki, Communication Technology: Basic Knowledge and Its Trend [III]: Error-Correction Coding, IEICE, vol. 90, No. 7, pp. 549-555, Jul. 2007.

Hidekazu Taoka et al., MIMO and CoMP in LTE-Advanced, NTT DOCOMO Technical Journal, 2010. vol. 18, No. 2, pp. 22-30.

Kazuhiko Fukawa, IEICE, "Knowledge Base", 4 groups (mobile, wireless), vol. 1, No. 6, pp. 1-9, Nov. 2010.

Akihiro Saito et al., Development of Multi-Base-Station Cooperative Transmission System, Panasonic Technical Journal, vol. 58, No. 4, pp. 20-25, Jan. 2013.

Naotaka Shibata et al., A Study of Uplink Throughput in Base Station Architecture Splitting LTE Physical Layer Functions, Proceedings 1 of communication society in conference of IEICE, 2015, p. 291, B-5-29.

International Search Report (English and Japanese) issued in International Application No. PCT/JP2017/039888, dated Jan. 9, 2018; ISA/JP.

* cited by examiner

RADIO APPARATUS AND RADIO COMMUNICATION METHOD

CROSS-REFERENCE TO RELATED APPLICATIONS

This application is a 371 U.S. National Stage of International Application No. PCT/JP2017/039888, filed on Nov. 6, 2017, which claims priority to Japanese Application No. 2016-220750, filed on Nov. 11, 2016. The entire disclosures of the above applications are incorporated herein by reference.

TECHNICAL FIELD

The present invention relates to a radio apparatus and a radio communication method.

BACKGROUND ART

Conventionally, in order to raise the flexibility of base station installation in radio communication systems, particularly mobile communication systems, configurations in which the functions of a base station are distributed between two apparatuses, namely, a BBU (Base Band Unit) and an RRH (Remote Radio Head), and the BBU and RRH are physically separated, have been considered. As one mode for functional splitting schemes between a BBU and an RRH, a functional splitting scheme in which the functions of the MAC (Media Access Control) layer and higher are performed by a BBU and the functions of the physical layer are performed by RRHs, as shown in FIG. 17, has been considered (see, e.g., Non-Patent Document 1). This functional splitting scheme is called a MAC-PHY splitting scheme or an L2 C-RAN (Layer 2 Centralized/Cloud-Radio Access Network) scheme.

On the other hand, as a mode of schemes for splitting the functions between a BBU and an RRH, a functional splitting scheme in which the functions of the MAC (Media Access Control) layer and higher and the coding functions, which are a part of the physical layer functions, are performed by a BBU, and the functions of the physical layer other than the coding functions are performed by RRHs, as shown in FIG. 18, has been considered (see, e.g., Non-Patent Document 2). This functional splitting scheme is called the SPP (Split-PHY Processing) scheme.

As schemes for demodulating radio signals received in a base station or a terminal apparatus, there are soft-decision demodulation schemes in which, instead of outputting signal bits obtained by demodulation as bit values 0 or 1, the signal bits are output as real-value ratios called likelihoods, indicating the probability that a signal bit is 0 or 1 (see, e.g., Non-Patent Document 3). In a soft-decision demodulation scheme, the output obtained by demodulation is called the LLR (Log Likelihood Ratio). In general, the larger the LLR value is in the positive direction, the higher the probability that the signal bit is 1, and the lower the value is in the negative direction (i.e., the higher the absolute value), the higher the probability that the signal bit is 0.

Additionally, in a mobile communication system, the area covered by a single RRH is referred to as a cell, and in general, the coverage areas of multiple adjacent cells overlap. For this reason, when a terminal apparatus is located near a cell edge, there is a problem in that the radio signals being exchanged between the terminal apparatus and a desired RRH can encounter interference from radio signals exchanged between the terminal apparatus and the RRH of an adjacent cell, thereby significantly reducing the radio transmission rate. As a means for solving such a problem, CoMP (Coordinated Multi-Point transmission/reception) technology, in which adjacent RRHs cooperate with each other to communicate with a terminal apparatus located near the cell edges, as shown, for example, in FIG. 19, has been considered (see, e.g., Non-Patent Document 4).

In FIG. 19, there are two cooperating RRHs, but there may be two or more RRHs. The possibility of installing RRHs at a high density and having multiple RRHs constantly performing CoMP with respect to multiple terminal apparatuses, regardless of whether or not the terminal apparatuses are located at the cell edges, thereby increasing the system capacity, has been considered for use in future mobile communication systems. CoMP techniques include a technique known as selective combining, in which, among the reception signals from the multiple cooperating RRHs, the reception signal having the highest reception quality is selected (see, e.g., Non-Patent Document 5). In this case, the reception quality refers, for example, to the received signal power, the received SNR (Signal to Noise Ratio), or the received SINR (Signal to Interference plus Noise Ratio). This selective combining may be applied to CoMP in BBUs and RRHs using a MAC-PHY split functional splitting scheme.

FIG. 20 is a diagram showing an example of a system configuration of a radio communication system 1000 that performs uplink selectively combined signal transmission with a conventional MAC-PHY split. The radio communication system 1000 includes a terminal apparatus 91, multiple RRHs 92-1 and 92-2, and a BBU 93. The RRHs 92-1 and the 92-2 are provided with similar structures, so the RRH 92-1 will be explained as an example.

The RRH 92-1 includes an RF (Radio Frequency) reception unit 921-1, a channel estimation unit 922-1, a demodulation unit 923-1, and a decoding unit 924-1. The BBU 93 includes a selective combining unit 931.

The RF reception unit 921-1 receives signals transmitted from the terminal apparatus 91. Of the received signals, the RF reception unit 921-1 outputs reference signals to the channel estimation unit 922-1, and outputs data signals to the demodulation unit 923-1. The reference signals are signals for extracting channel information regarding the radio transmission path, and include signals that are known between the terminal apparatus and the RRH. The data signal is a signal that is to be transmitted to the BBU, including a series of signal bits.

The channel estimation unit 922-1 estimates the channel information and measures the reception quality on the radio transmission path on the basis of the reference signals output from the RF reception unit 921-1. The channel estimation unit 922-1 outputs the channel information estimation result and the reception quality measurement result to the demodulation unit 923-1.

The demodulation unit 923-1 uses the channel information estimation result and the reception quality measurement result output from the channel estimation unit 922-1 to obtain LLR values (soft decision values) by performing equalization and soft-decision demodulation on the received data signals. The demodulation unit 923-1 outputs the obtained LLR values (soft decision values) and the reception quality measurement result (information on the reception quality) to the decoding unit 924-1.

The decoding unit 924-1 decodes the LLR values output from the demodulation unit 923-1 to restore bit data (hard decision values). It is to be noted that during this decoding step, an error detection code called a CRC (Cyclic Redundancy Check) is used to determine whether or not errors are included in the decoded bit data. Each RRH 92 transmits the decoded bit data and the information on the reception quality (hereinafter referred to as "reception quality information") measured by the channel estimation unit 922 to the BBU 93.

The selective combining unit 931 of the BBU 93 compares the reception quality information transmitted from each RRH 92, selects the bit data of the RRH 92 having the higher reception quality, and discards the bit data transmitted from the other RRH 92.

Additionally, as one CoMP technique on an uplink (the direction from the RRHs to the BBU), a technique in which an SPP functional splitting scheme is applied, LLRs obtained in the respective RRHs are transmitted to the BBU, and the BBU combines the LLRs obtained by the respective RRHs has been considered (see Non-Patent Document 6).

FIG. 21 is a diagram showing an example of a system configuration of a radio communication system 1000a that performs uplink LLR-combined signal transmission in conventional SPP. The radio communication system 1000a includes a terminal apparatus 91a, multiple RRHs 92a-1 and 92a-2, and a BBU 93a. The RRHs 92a-1 and the 92a-2 are provided with similar structures, so the RRH 92a-1 will be explained as an example.

The RRH 92a-1 includes an RF reception unit 921a-1, a channel estimation unit 922a-1, and a demodulation unit 923a-1. The BBU 93a includes an LLR combining unit 932 and a decoding unit 933.

The RF reception unit 921a-1 receives signals transmitted from the terminal apparatus 91a. Of the received signals, the RF reception unit 921a-1 outputs reference signals to the channel estimation unit 922a-1, and outputs data signals to the demodulation unit 923a-1. The channel estimation unit 922a-1 estimates the channel information and measures the reception quality on the radio transmission path on the basis of the reference signals output from the RF reception unit 921a-1. The channel estimation unit 922a-1 outputs the channel information estimation result and the reception quality measurement result to the demodulation unit 923a-1. The demodulation unit 923a-1 uses the channel information estimation result and the reception quality measurement result output from the channel estimation unit 922a-1 to obtain LLR values (soft decision values) by performing equalization and soft-decision demodulation on the received data signals. The demodulation unit 923a-1 transmits the obtained LLR values (soft decision values) to the BBU 93a.

The LLR combining unit 932 in the BBU 93a combines the LLR values output from the RRHs 92a and outputs the combined LLR value to the decoding unit 933. The decoding unit 933 decodes the combined LLR value output from the LLR combining unit 932 and thereby obtains signal bit data (hard decision values). The decoding unit 933 outputs the obtained signal bit data.

As described above, with an SPP base station functional splitting scheme, LLR-combined CoMP is used to input more highly reliable LLR values to the decoding unit 933 for decoding, thereby making it possible to decrease the bit errors in the radio signals and improve the radio transmission characteristics.

PRIOR ART DOCUMENTS

Non-Patent Documents

Non-Patent Document 1: Yasuhiko MATSUNAGA, "Radio Access Network Architecture Evolution toward 5G", IEICE Technical Report, vol. 114, no. 254, RCS2014-172, pp. 89-94, October 2014

Non-Patent Document 2: Kenji MIYAMOTO et al., "Proposal on Functional-Split Scheme of Base Stations for Future Radio Access", IEICE Technical Report, CS2015-15, pp. 33-38, July 2015

Non-Patent Document 3: Tomoaki OHTSUKI, "Communication Technology: Basic Knowledge and Its Trend [III]: Error-Correction Coding", The Journal of the Institute of Electronics, Information and Communication Engineers, vol. 90, no. 7, pp. 549-555, July 2007

Non-Patent Document 4: Hidekazu TAOKA et al., "MIMO and Coordinated Multipoint Transmission/Reception Technology in LTE-Advanced", NTT DOCOMO Technical Journal, vol. 18, no. 2, pp. 22-30.

Non-Patent Document 5: Institute of Electronics, Information and Communication Engineers "Knowledge Base", Group 4 (mobile/radio)—Part 1, Chapter 6, pp. 1-9, November 2010

Non-Patent Document 6: Akihiro SAITO et al., "Development of Multi-Base-Station Cooperative Transmission System", Panasonic Technical Journal, vol. 58, no. 4, pp. 20-25, January 2013

SUMMARY OF INVENTION

Problems to be Solved by the Invention

For cases in which multiple RRHs constantly perform CoMP with respect to multiple terminal apparatuses regardless of whether or not the terminal apparatuses are located at cell edges, in conventional uplink selective combining techniques with a MAC-PHY split or conventional uplink LLR combining methods with SPP, decoded bit data and reception quality information or demodulated LLR values are transmitted from all cooperating RRHs, regardless of whether or not the radio transmission characteristics are improved by selective combining or LLR combining. However, there is no need to send, to the BBU, bit data and reception quality information or LLR values that do not contribute to improvement of the radio transmission characteristics. With such conventional techniques, there was a problem in that the total transmission data volume between the multiple RRHs and the BBU is made unnecessarily large.

In view of the abovementioned circumstances, the present invention has the purpose of providing a technology that can reduce the total transmission data volume between multiple RRHs and a BBU.

Means for Solving the Problems

An aspect of the present invention is a radio apparatus in a radio communication system that includes the radio apparatus and a signal processing apparatus that function as a base station, the radio apparatus including: a channel estimation unit that, on the basis of a radio signal transmitted from a terminal apparatus, measures a reception quality of the radio signal; and a transmission control unit that, on the basis of the reception quality measured by the channel estimation unit, controls transmission, to the signal processing apparatus, of bit data or a log likelihood ratio obtained from the radio signal.

In the above-mentioned radio apparatus, when the reception quality is less than a predetermined threshold value, the transmission control unit may discard the bit data or the log likelihood ratio without transmission to the signal processing apparatus.

In the above-mentioned radio apparatus, the channel estimation unit may measure, as the reception quality, any one of a received signal power, a received SNR (Signal to Noise Ratio), and a received SINR (Signal to Interference plus Noise Ratio).

In the above-mentioned radio apparatus, when the reception quality is less than a predetermined threshold value, the transmission control unit may discard the bit data or the log likelihood ratio without transmission to the signal processing apparatus, and notify the signal processing apparatus that the bit data or the log likelihood ratio will not be transmitted to the signal processing apparatus.

An aspect of the present invention is a radio communication method performed by a radio apparatus in a radio communication system that includes the radio apparatus and a signal processing apparatus that function as a base station, the radio communication method including: a channel estimation step of measuring, on the basis of a radio signal transmitted from a terminal apparatus, a reception quality of the radio signal; and a transmission control step of controlling, on the basis of the reception quality measured in the channel estimation step, transmission, to the signal processing apparatus, of bit data or a log likelihood ratio obtained from the radio signal.

Advantageous Effect of the Invention

With the present invention, it becomes possible to reduce the total transmission data volume between multiple RRHs and a BBU.

MODES FOR CARRYING OUT THE INVENTION

Hereinbelow, embodiments of the present invention will be explained with reference to the drawings.

In the following description, the radio communication systems according to the first to eighth embodiments are applied to a MAC-PHY split functional splitting scheme and the radio communication systems according to the ninth to sixteenth embodiments are applied to an SPP scheme.

First Embodiment

Figure 1:
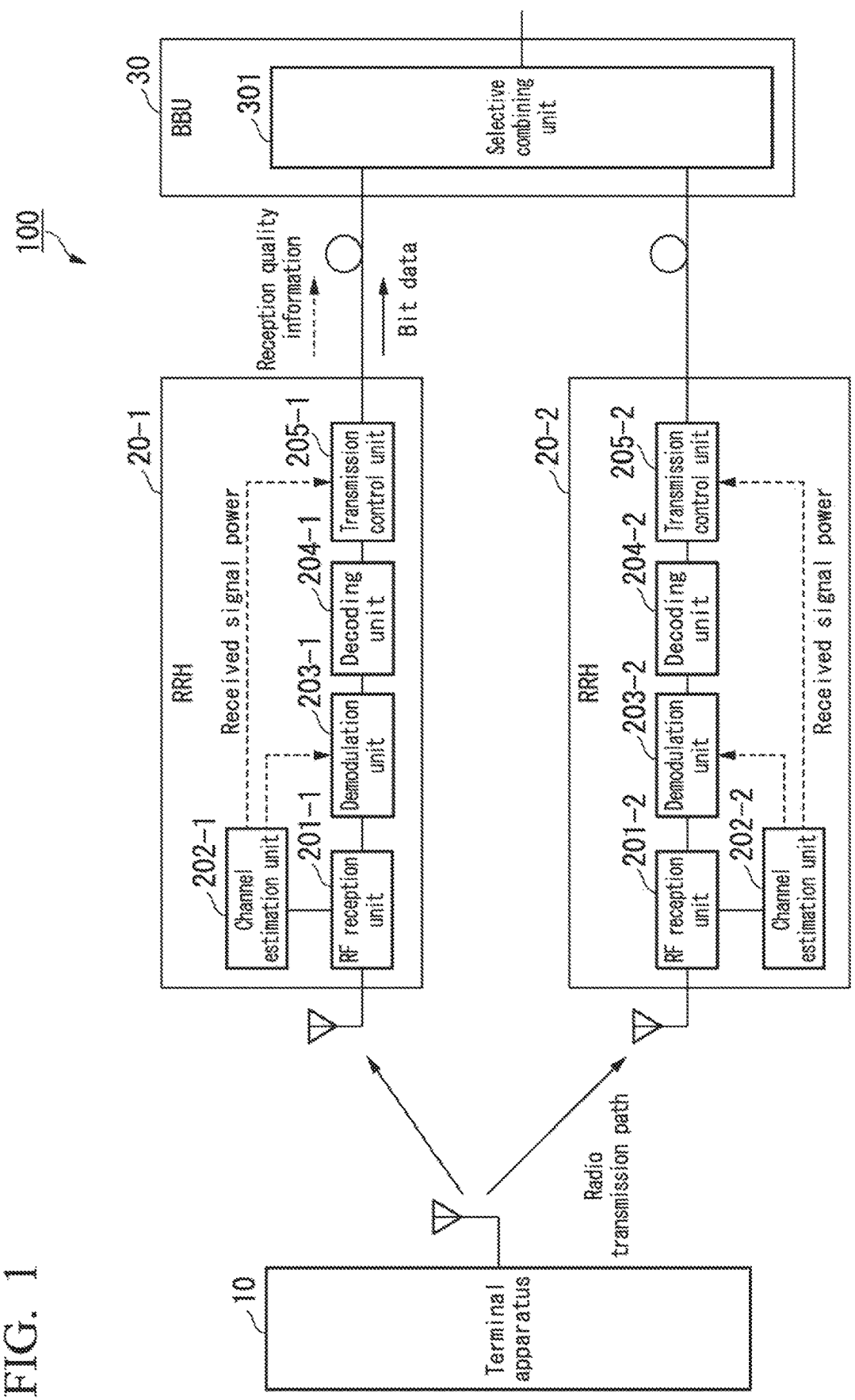
FIG. 1 is a configuration diagram showing the system configuration of a radio communication system 100 according to a first embodiment.

FIG. 1 is a configuration diagram showing a system configuration of a radio communication system 100 according to the first embodiment. The radio communication system 100 includes a terminal apparatus 10, multiple RRHs (radio apparatuses) 20-1 and 20-2, and a BBU (signal processing apparatus) 30. It is to be noted that in the following description, when making no particular distinction between the RRHs 20-1 and 20-2, they will be described as RRHs 20. The RRHs 20 and the BBU 30 function as a base station. The RRHs 20-1 and 20-2 and the BBU 30 are communicably connected by wire (for example, optical fiber or coaxial cable). Since the RRHs 20-1 and 20-2 have similar structures, the RRH 20-1 will be explained as an example.

The RRH 20-1 includes an RF reception unit 201-1, a channel estimation unit 202-1, a demodulation unit 203-1, a decoding unit 204-1, and a transmission control unit 205-1.

The RF reception unit 201-1 receives signals (radio signals) transmitted from the terminal apparatus 10. Of the received signals, the RF reception unit 201-1 outputs reference signals to the channel estimation unit 202-1, and outputs data signals to the demodulation unit 203-1.

The channel estimation unit 202-1 takes, as inputs, the reference signals output from the RF reception unit 201-1.

The channel estimation unit 202-1 estimates the channel information and measures the reception quality on the radio transmission path on the basis of the input reference signals. For example, the channel estimation unit 202-1 measures, as the reception quality, the received signal power of the signals received in the RF reception unit 201-1. The channel estimation unit 202-1 outputs the estimated channel information and the reception quality measurement result to the demodulation unit 203-1. Additionally, the channel estimation unit 202-1 outputs the reception quality measurement result to the transmission control unit 205-1.

The demodulation unit 203-1 takes, as inputs, the data signals output from the RF reception unit 201-1 and the channel information estimation result and the reception quality measurement result output from the channel estimation unit 202-1. The demodulation unit 203-1 uses the input channel information estimation result and reception quality measurement result to obtain LLR values (soft decision values) by performing equalization and soft-decision demodulation on the input data signals. The demodulation unit 203-1 outputs the obtained LLR values (soft decision values) to the decoding unit 204-1.

The decoding unit 204-1 takes, as inputs, the LLR values (soft decision values) output from the demodulation unit 203-1. The decoding unit 204-1 restores bit data by decoding the input LLR values. The decoding unit 204-1 outputs the restored bit data to the transmission control unit 205-1.

The transmission control unit 205-1 takes, as inputs, the bit data output from the decoding unit 204-1 and the reception quality measurement result output from the channel estimation unit 202-1. The transmission control unit 205-1 controls the transmission of the bit data in accordance with the input reception quality measurement result. Specifically, the transmission control unit 205-1 initially compares the received signal power, which is the input measurement result, with a first threshold value for determining the received signal power. Next, if the received signal power is less than the first threshold value, then the transmission control unit 205-1 discards the bit data and information on the received signal power (reception quality information). On the other hand, if the received signal power is greater than or equal to the first threshold value, then the transmission control unit 205-1 transmits the bit data and the information on the received signal power (reception quality information) to the BBU 30.

FIG. 1 shows the case in which the received signal power in the RRH 20-1 is greater than or equal to the first threshold value, and the received signal power in the RRH 20-2 is less than the first threshold value. In this case, the transmission control unit 205-1 in the RRH 20-1 transmits the bit data and the reception quality information to the BBU 30, and the transmission control unit 205-2 in the RRH 20-2 discards the bit data and the reception quality information without transmission to the BBU 30.

The BBU 30 includes a selective combining unit 301. The selective combining unit 301 receives the bit data and the reception quality information transmitted from the RRHs 20. The selective combining unit 301 selects one set of bit data from among the received bit data. Specifically, if there is just a single set of received bit data, then the selective combining unit 301 selects the received bit data. On the other hand, if there are multiple sets of received bit data, then the selective combining unit 301 selects, from among the received bit data, the set of bit data having the highest received signal power included in the reception quality information, and discards the other sets of bit data.

With the radio communication system 100 configured in the above manner, the RRHs 20 control the transmission of bit data in accordance with the received signal power of signals transmitted from the terminal apparatus 10. For example, the RRHs 20 do not transmit, to the BBU 30, bit data and reception quality information that do not contribute to the improvement of the radio transmission characteristics, such as bit data obtained from signals having a received signal power that is less than the first threshold value. As a result thereof, in comparison with conventional systems, the number of sets of bit data and the number of sets of reception quality information transmitted to the BBU 30 are decreased. For this reason, it becomes possible to reduce the total transmission data volume between the multiple RRHs and the BBU.

Second Embodiment

Figure 2:
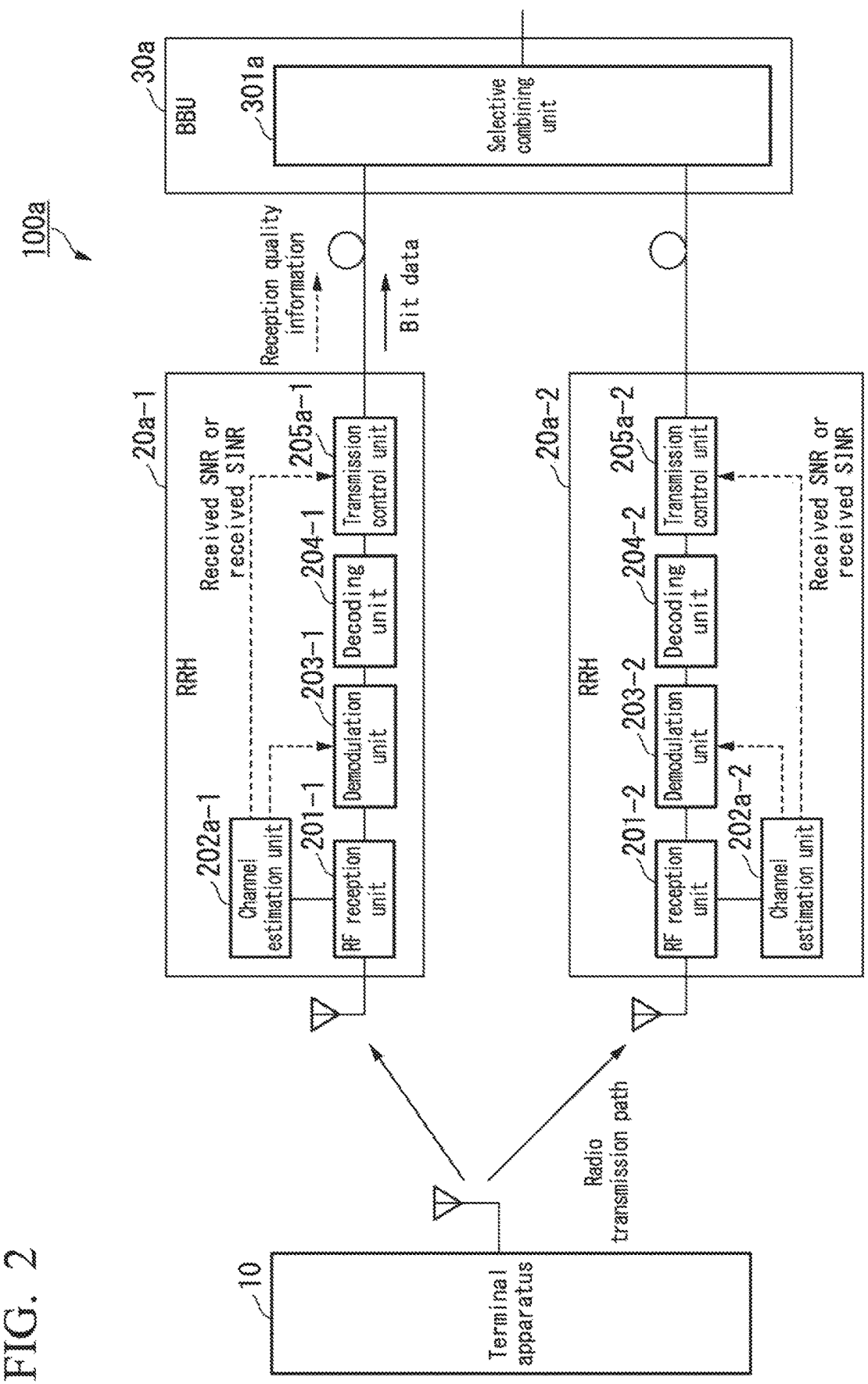
FIG. 2 is a configuration diagram showing the system configuration of a radio communication system 100a according to a second embodiment.

FIG. 2 is a configuration diagram showing a system configuration of a radio communication system 100a according to the second embodiment. The radio communication system 100a includes a terminal apparatus 10, multiple RRHs 20a-1 and 20a-2, and a BBU 30a. It is to be noted that in the following description, when making no particular distinction between the RRHs 20a-1 and 20a-2, they will be described as RRHs 20a. The RRHs 20a and the BBU 30a function as a base station. The RRHs 20a-1 and 20a-2 and the BBU 30a are communicably connected by wire (for example, optical fiber or coaxial cable). Since the RRHs 20a-1 and 20a-2 have similar structures, the RRH 20a-1 will be explained as an example.

The RRH 20a-1 includes an RF reception unit 201-1, a channel estimation unit 202a-1, a demodulation unit 203-1, a decoding unit 204-1 and a transmission control unit 205a-1.

The structure of the RRH 20a-1 differs from that of the RRH 20-1 in that a channel estimation unit 202a-1 and a transmission control unit 205a-1 are provided instead of the channel estimation unit 202-1 and the transmission control unit 205-1. The structure of the RRH 20a-1 is otherwise the same as that of the RRH 20-1. For this reason, the description of the RRH 20a-1 overall will be omitted, and the channel estimation unit 202a-1 and the transmission control unit 205a-1 will be described.

The channel estimation unit 202a-1 takes, as inputs, the reference signals output from the RF reception unit 201-1. The channel estimation unit 202a-1 estimates the channel information and measures the reception quality on the radio transmission path on the basis of the input reference signals. For example, the channel estimation unit 202a-1 measures, as the reception quality, the received SNR of the signals received in the RF reception unit 201-1. In this case, the received SNR is determined by measuring the noise power by using the reference signals, determining the signal power by subtracting the noise power from the received signal power, and calculating the ratio of the signal power to the noise power. The channel estimation unit 202a-1 outputs the estimated channel information and the reception quality measurement result to the demodulation unit 203-1. Additionally, the channel estimation unit 202a-1 outputs the reception quality measurement result to the transmission control unit 205a-1.

The transmission control unit 205a-1 takes, as inputs, the bit data output from the decoding unit 204-1 and the reception quality measurement result output from the channel estimation unit 202a-1. The transmission control unit 205a-1 controls the transmission of the bit data in accordance with the input reception quality measurement result. Specifically, the transmission control unit 205a-1 initially compares the received SNR, which is the input measurement result, with a second threshold value for determining the received SNR. Next, if the received SNR is less than the second threshold value, then the transmission control unit 205a-1 discards the bit data and information on the received SNR (reception quality information). On the other hand, if the received SNR is greater than or equal to the second threshold value, then the transmission control unit 205a-1 transmits the bit data and the information on the received SNR (reception quality information) to the BBU 30a.

The BBU 30a includes a selective combining unit 301a. The selective combining unit 301a receives the bit data and the reception quality information transmitted from the RRHs 20. The selective combining unit 301a selects one set of bit data from among the received bit data. Specifically, if there is just a single set of received bit data, then the selective combining unit 301a selects the received bit data. On the other hand, if there are multiple sets of received bit data, then the selective combining unit 301a selects, from among the received bit data, the set of bit data having the highest received SNR included in the reception quality information, and discards the other sets of bit data.

With the radio communication system 100a configured in the above manner, the RRHs 20a control the transmission of bit data in accordance with the received SNR of signals transmitted from the terminal apparatus 10. For example, the RRHs 20a do not transmit, to the BBU 30a, bit data and reception quality information that do not contribute to the improvement of the radio transmission characteristics, such as bit data obtained from signals having a received SNR that is less than the second threshold value. As a result thereof, in comparison with conventional systems, the number of sets of bit data and the number of sets of reception quality information transmitted to the BBU 30a are decreased. For this reason, it becomes possible to reduce the total transmission data volume between the multiple RRHs and the BBU.

Modified Example

The channel estimation unit 202a-1 may measure the received SINR, rather than the received SNR, as the reception quality. When the RRHs 20a-1 are configured in this way, if there are multiple sets of received bit data, then the selective combining unit 301a selects, from among the received bit data, the set of bit data having the highest received SINR included in the reception quality information, and discards the other sets of bit data.

Third Embodiment

Figure 3:
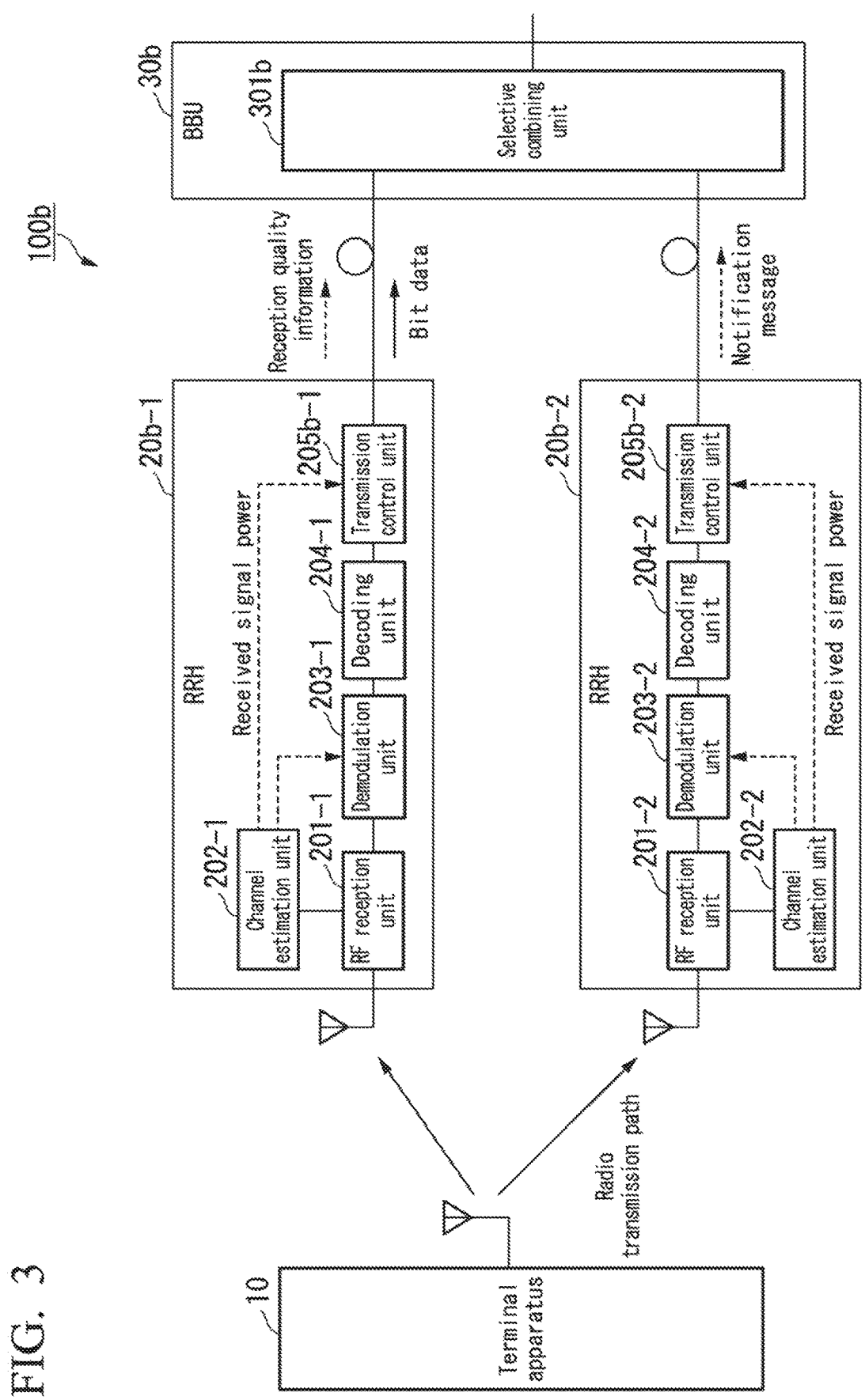
FIG. 3 is a configuration diagram showing the system configuration of a radio communication system 100b according to a third embodiment.

FIG. 3 is a configuration diagram showing a system configuration of a radio communication system 100b according to the third embodiment. The radio communication system 100b includes a terminal apparatus 10, multiple RRHs 20b-1 and 20b-2, and a BBU 30b. It is to be noted that in the following description, when making no particular distinction between the RRHs 20b-1 and 20b-2, they will be described as RRHs 20b. The RRHs 20b and the BBU 30b function as a base station. The RRHs 20b-1 and 20b-2 and the BBU 30b are communicably connected by wire (for example, optical fiber or coaxial cable). Since the RRHs 20b-1 and 20b-2 have similar structures, the RRH 20b-1 will be explained as an example.

The RRH 20b-1 includes an RF reception unit 201-1, a channel estimation unit 202-1, a demodulation unit 203-1, a decoding unit 204-1, and a transmission control unit 205b-1.

The structure of the RRH 20b-1 differs from that of the RRH 20-1 in that a transmission control unit 205b-1 is provided instead of the transmission control unit 205-1. The structure of the RRH 20b-1 is otherwise the same as that of the RRH 20-1. For this reason, the description of the RRH 20b-1 overall will be omitted, and the transmission control unit 205b-1 will be described.

The transmission control unit 205b-1 takes, as inputs, the bit data output from the decoding unit 204-1 and the reception quality measurement result output from the channel estimation unit 202-1. The transmission control unit 205b-1 controls the transmission of the bit data in accordance with the input reception quality measurement result. Specifically, the transmission control unit 205b-1 initially compares the received signal power, which is the input measurement result, with a first threshold value. Next, if the received signal power is less than the first threshold value, then the transmission control unit 205b-1 discards the bit data and information on the received signal power (reception quality information), and also generates a notification message indicating that the bit data and the reception quality information will not be transmitted, and transmits the generated notification message to the BBU 30b. On the other hand, if the received signal power is greater than or equal to the first threshold value, then the transmission control unit 205b-1 transmits the bit data and the reception quality information of the received signal power to the BBU 30b.

Here, if the received signal power in the RRH 20b-1 is greater than or equal to the first threshold value and the received signal power in the RRH 20b-2 is less than the first threshold value, then, as shown in FIG. 3, the transmission control unit 205b-1 in the RRH 20b-1 transmits the bit data and the reception quality information to the BBU 30b, while the transmission control unit 205b-2 in the RRH 20b-2 discards the bit data and the reception quality information without transmission to the BBU 30b, generates a notification message, and transmits the generated notification message to the BBU 30b.

The BBU 30b includes a selective combining unit 301b. The selective combining unit 301b receives the bit data and the reception quality information transmitted from the RRHs 20b. The selective combining unit 301b selects one set of bit data from among the received bit data. Specifically, if there is just a single set of received bit data, then the selective combining unit 301b selects the received bit data. On the other hand, if there are multiple sets of received bit data, then the selective combining unit 301b selects, from among the received bit data, the set of bit data having the highest received signal power included in the reception quality information, and discards the other sets of bit data. Additionally, the selective combining unit 301b receives the notification messages transmitted from the RRHs 20b.

With the radio communication system 100b configured in the above manner, it is possible to obtain advantageous effects similar to those of the first embodiment.

Additionally, if the received signal power of the received signals is less than the first threshold value, then the RRHs 20b transmit, to the BBU 30b, a notification message indicating that the bit data and the reception quality information will not be transmitted. As a result thereof, the BBU 30b can recognize whether or not information has been received from all of the cooperating RRHs 20b, thereby allowing for a reduction in the time spent in waiting for reception.

Modified Example

The BBU 30b may be configured so as to transmit, to all cooperating RRHs 20b, a message providing notification that reception has been completed when the signals received from one of the RRHs 20b have been received without error.

Fourth Embodiment

Figure 4:
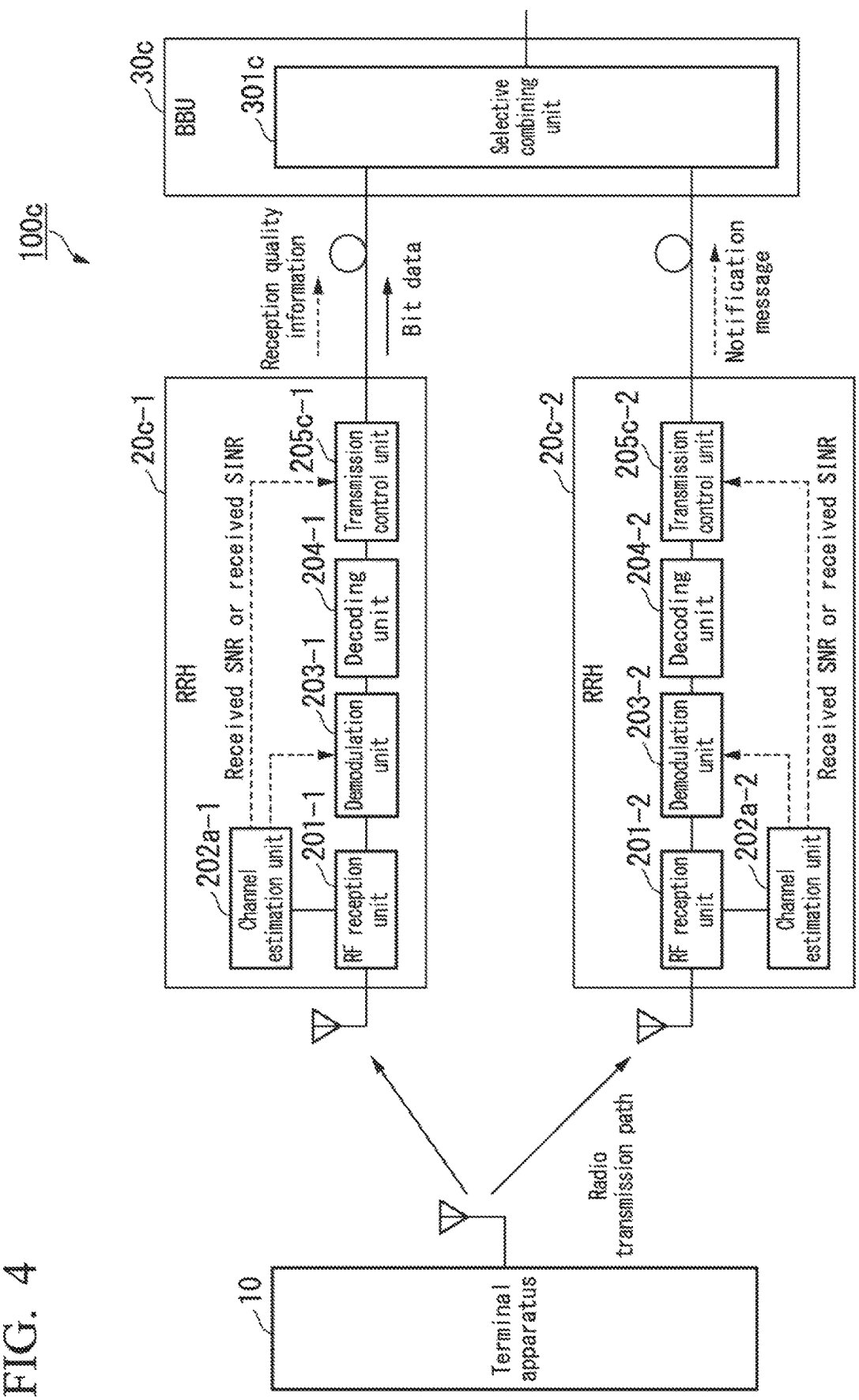
FIG. 4 is a configuration diagram showing the system configuration of a radio communication system 100c according to a fourth embodiment.

FIG. 4 is a configuration diagram showing a system configuration of a radio communication system 100c according to the fourth embodiment. The radio communication system 100c includes a terminal apparatus 10, multiple RRHs 20c-1 and 20c-2, and a BBU 30c. It is to be noted that in the following description, when making no particular distinction between the RRHs 20c-1 and 20c-2, they will be described as RRHs 20c. The RRHs 20c and the BBU 30c function as a base station. The RRHs 20c-1 and 20c-2 and the BBU 30c are communicably connected by wire (for example, optical fiber or coaxial cable). Since the RRHs 20c-1 and 20c-2 have similar structures, the RRH 20c-1 will be explained as an example.

The RRH 20c-1 includes an RF reception unit 201-1, a channel estimation unit 202a-1, a demodulation unit 203-1, a decoding unit 204-1, and a transmission control unit 205c-1.

The structure of the RRH 20c-1 differs from that of the RRH 20a-1 in that a transmission control unit 205c-1 is provided instead of the transmission control unit 205a-1. The structure of the RRH 20c-1 is otherwise the same as that of the RRH 20a-1. For this reason, the description of the RRH 20c-1 overall will be omitted, and the transmission control unit 205c-1 will be described.

The transmission control unit 205c-1 takes, as inputs, the bit data output from the decoding unit 204-1 and the reception quality measurement result output from the channel estimation unit 202a-1. The transmission control unit 205c-1 controls the transmission of the bit data in accordance with the input reception quality measurement result. Specifically, the transmission control unit 205c-1 initially compares the received SNR, which is the input measurement result, with a second threshold value. Next, if the received SNR is less than the second threshold value, then the transmission control unit 205c-1 discards the bit data and information on the received SNR (reception quality information), and also generates a notification message indicating that the bit data and the reception quality information will not be transmitted, and transmits the generated notification message to the BBU 30c. On the other hand, if the received SNR is greater than or equal to the second threshold value, then the transmission control unit 205c-1 transmits the bit data and the information on the received SNR (reception quality information) to the BBU 30c.

The BBU 30c includes a selective combining unit 301c. The selective combining unit 301c receives the bit data and the reception quality information transmitted from the RRHs 20c. The selective combining unit 301c selects one set of bit data from among the received bit data. Specifically, if there is just a single set of received bit data, then the selective combining unit 301c selects the received bit data. On the other hand, if there are multiple sets of received bit data, then the selective combining unit 301c selects, from among the received bit data, the set of bit data having the highest received SNR included in the reception quality information, and discards the other sets of bit data. Additionally, the selective combining unit 301c receives notification messages transmitted from the RRHs 20c.

With the radio communication system 100c configured in the above manner, it is possible to obtain advantageous effects similar to those of the second embodiment.

Additionally, if the received SNR of the received signals is less than the second threshold value, then the RRHs 20c transmit, to the BBU 30c, a notification message indicating that the bit data and the reception quality information will not be transmitted. As a result thereof, the BBU 30c can recognize whether or not information has been received from all of the cooperating RRHs 20c, thereby allowing for a reduction in the time spent in waiting for reception.

Modified Examples

The channel estimation unit 202a-1 may measure the received SINR, rather than the received SNR, as the reception quality. When the RRH 20c-1 is configured in this way, if there are multiple sets of received bit data, then the selective combining unit 301c selects, from among the received bit data, the set of bit data having the highest received SINR included in the reception quality information, and discards the other sets of bit data.

The BBU 30c may be configured so as to transmit, to all cooperating RRHs 20c, a message providing notification that reception has been completed when the signals received from one of the RRHs 20c have been received without error.

Fifth Embodiment

Figure 5:
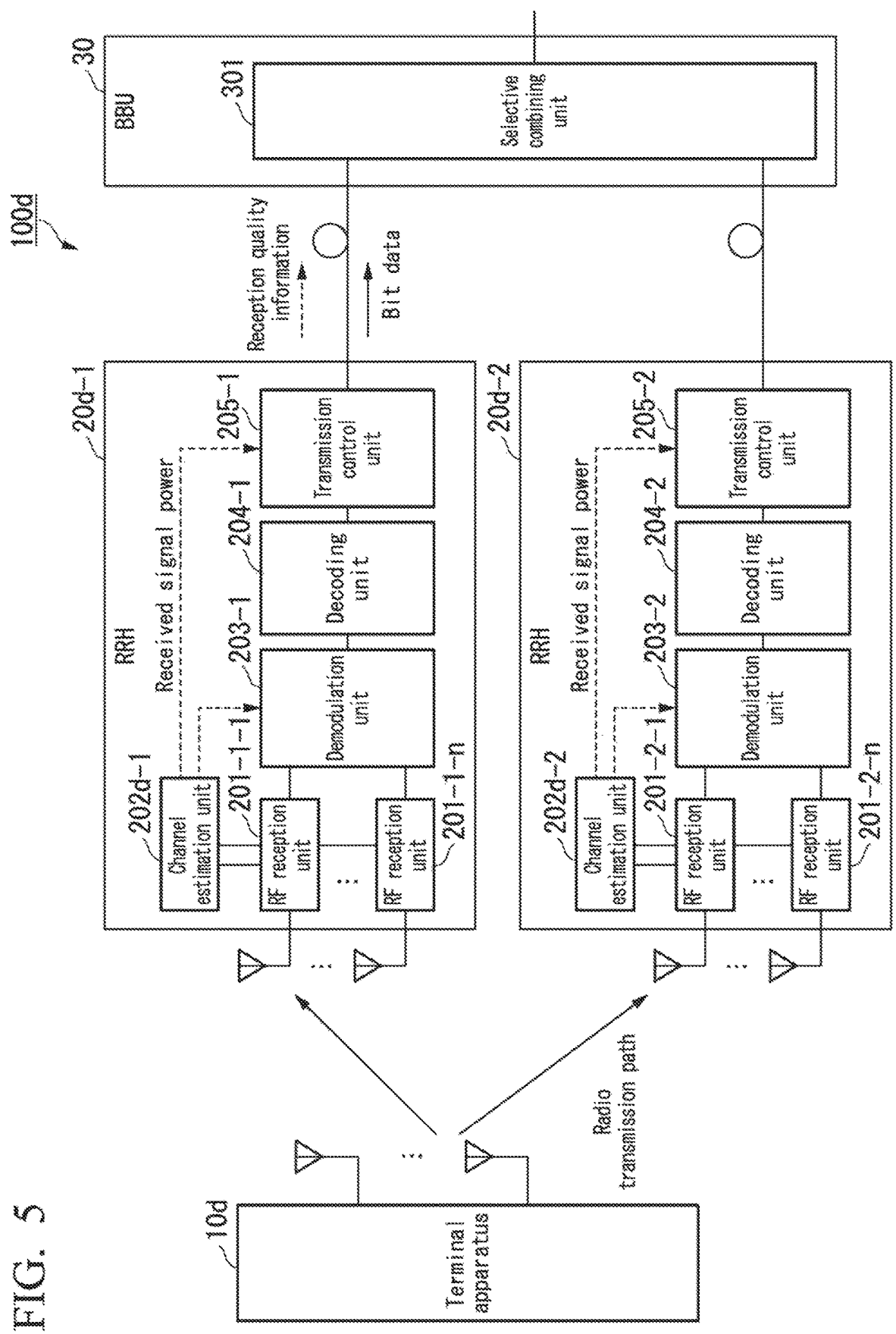
FIG. 5 is a configuration diagram showing the system configuration of a radio communication system 100d according to a fifth embodiment.

FIG. 5 is a configuration diagram showing a system configuration of a radio communication system 100d according to the fifth embodiment. The radio communication system 100d includes a terminal apparatus 10d, multiple RRHs 20d-1 and 20d-2, and a BBU 30.

In the fifth embodiment, the terminal apparatus 10d and the RRHs 20d are provided with multiple antennas, and MIMO (Multiple-Input Multiple-Output) transmissions are performed between the terminal apparatus 10d and the RRHs 20d. In this case, the RRH 20d-1 includes multiple RF reception units 201-1-1 to 201-1-n (where n is an integer greater than or equal to 2), a channel estimation unit 202d-1, a demodulation unit 203-1, a decoding unit 204-1, and a transmission control unit 205-1.

Each of the multiple RF reception units 201-1-1 to 201-1-n is connected to one channel estimation unit 202d-1. The channel estimation unit 202d-1 estimates the channel information and measures the reception quality on the radio transmission path for the signals received by each of the RF reception units 201-1-1 to 201-1-n. It is to be noted that the channel estimation unit 202d-1 may calculate a total received signal power on the basis of reference signals output from the multiple RF reception units 201-1-1 to 201-1-n, and output the calculated total received signal power to the transmission control unit 205-1, or may output the average received signal power to the transmission control unit 205-1. The operations in the demodulation unit 203-1, the decoding unit 204-1, and the transmission control unit 205-1 are similar to those in the functional units having the same names in the first embodiment. Additionally, the BBU 30 in the fifth embodiment has a structure similar to that of the BBU 30 in the first embodiment, so the description thereof will be omitted.

With the radio communication system 100d configured in the above manner, it is possible to obtain advantageous effects similar to those of the first embodiment.

Additionally, with the radio communication system 100d, it becomes possible to reduce the transmission data volume between the RRHs 20d and the BBU 30 even for MIMO transmission.

Sixth Embodiment

Figure 6:
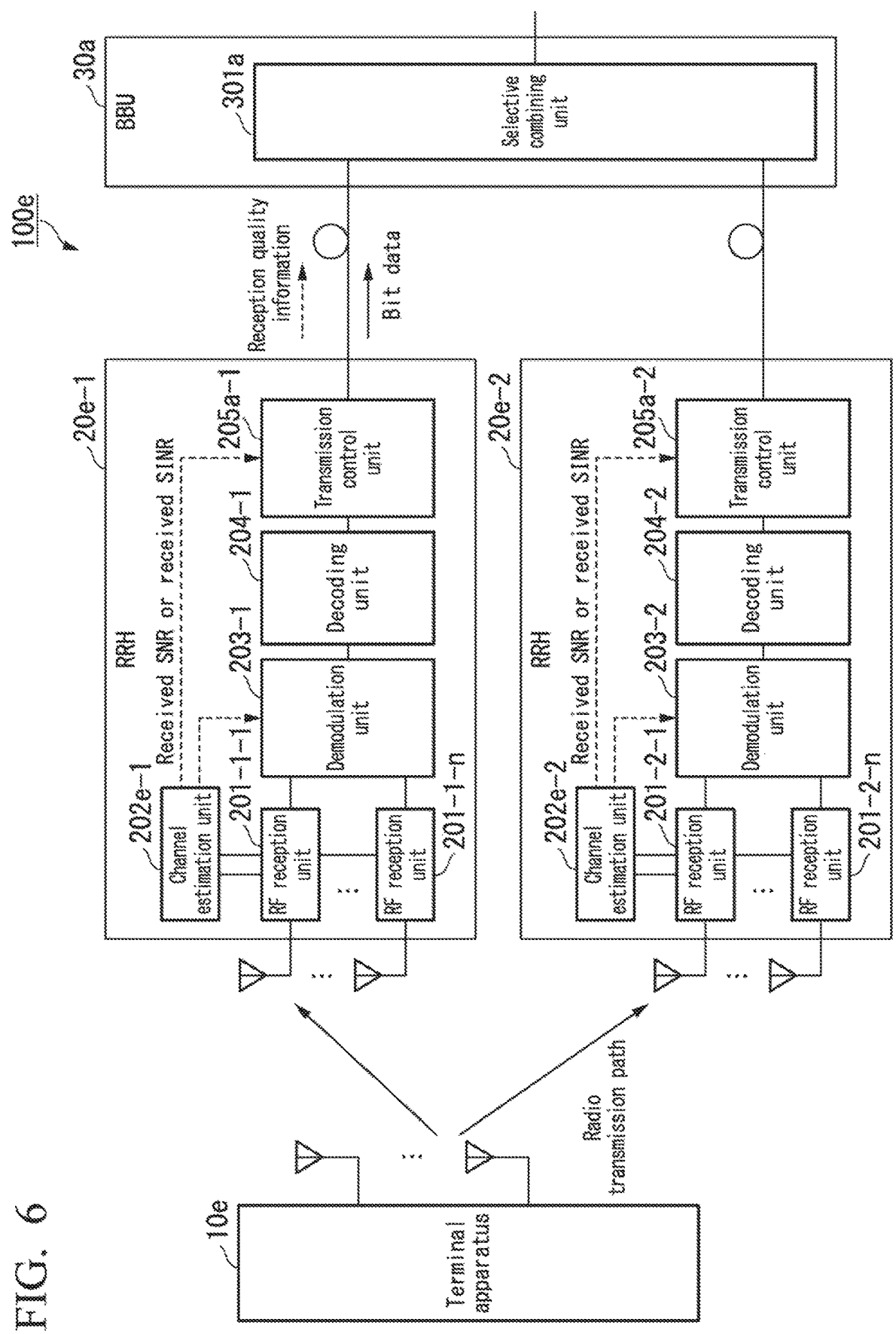
FIG. 6 is a configuration diagram showing the system configuration of a radio communication system 100e according to a sixth embodiment.

FIG. 6 is a configuration diagram showing a system configuration of a radio communication system 100e according to the sixth embodiment. The radio communication system 100e includes a terminal apparatus 10e, multiple RRHs 20e-1 and 20e-2, and a BBU 30a.

In the sixth embodiment, the terminal apparatus 10e and the RRHs 20e are provided with multiple antennas, and MIMO transmissions are performed between the terminal apparatus 10e and the RRHs 20e. In this case, the RRH 20e-1 includes multiple RF reception units 201-1-1 to 201-1-n, a channel estimation unit 202e-1, a demodulation unit 203-1, a decoding unit 204-1, and a transmission control unit 205a-1.

Each of the multiple RF reception units 201-1-1 to 201-1-n is connected to one channel estimation unit 202e-1. The channel estimation unit 202e-1 estimates the channel information and measures the reception quality on the radio transmission path for the signals received by each of the RF reception units 201-1-1 to 201-1-n. It is to be noted that the channel estimation unit 202e-1 may calculate a total received SNR on the basis of reference signals output from the multiple RF reception units 201-1-1 to 201-1-n and output the calculated total received SNR to the transmission control unit 205a-1, or may output the average received SNR to the transmission control unit 205a-1. The operations in the demodulation unit 203-1, the decoding unit 204-1, and the transmission control unit 205a-1 are similar to those in the functional units having the same names in the second embodiment. Additionally, the BBU 30a in the sixth embodiment has a structure similar to that of the BBU 30a in the second embodiment, so the description thereof will be omitted.

With the radio communication system 100e configured in the above manner, it is possible to obtain advantageous effects similar to those of the second embodiment.

Additionally, with the radio communication system 100e, it becomes possible to reduce the transmission data volume between the RRHs 20e and the BBU 30a even for MIMO transmission.

Modified Examples

The sixth embodiment may be modified in a manner similar to the second embodiment.

Additionally, if the received SINR is measured as the reception quality, rather than the received SNR, then the channel estimation unit 202e-1 may calculate a total received SINR on the basis of the reference signals output from the multiple RF reception units 201-1-1 to 201-1-n and output the calculated total received SINR to the transmission control unit 205a-1, or may output the average received SINR to the transmission control unit 205a-1.

Seventh Embodiment

Figure 7:
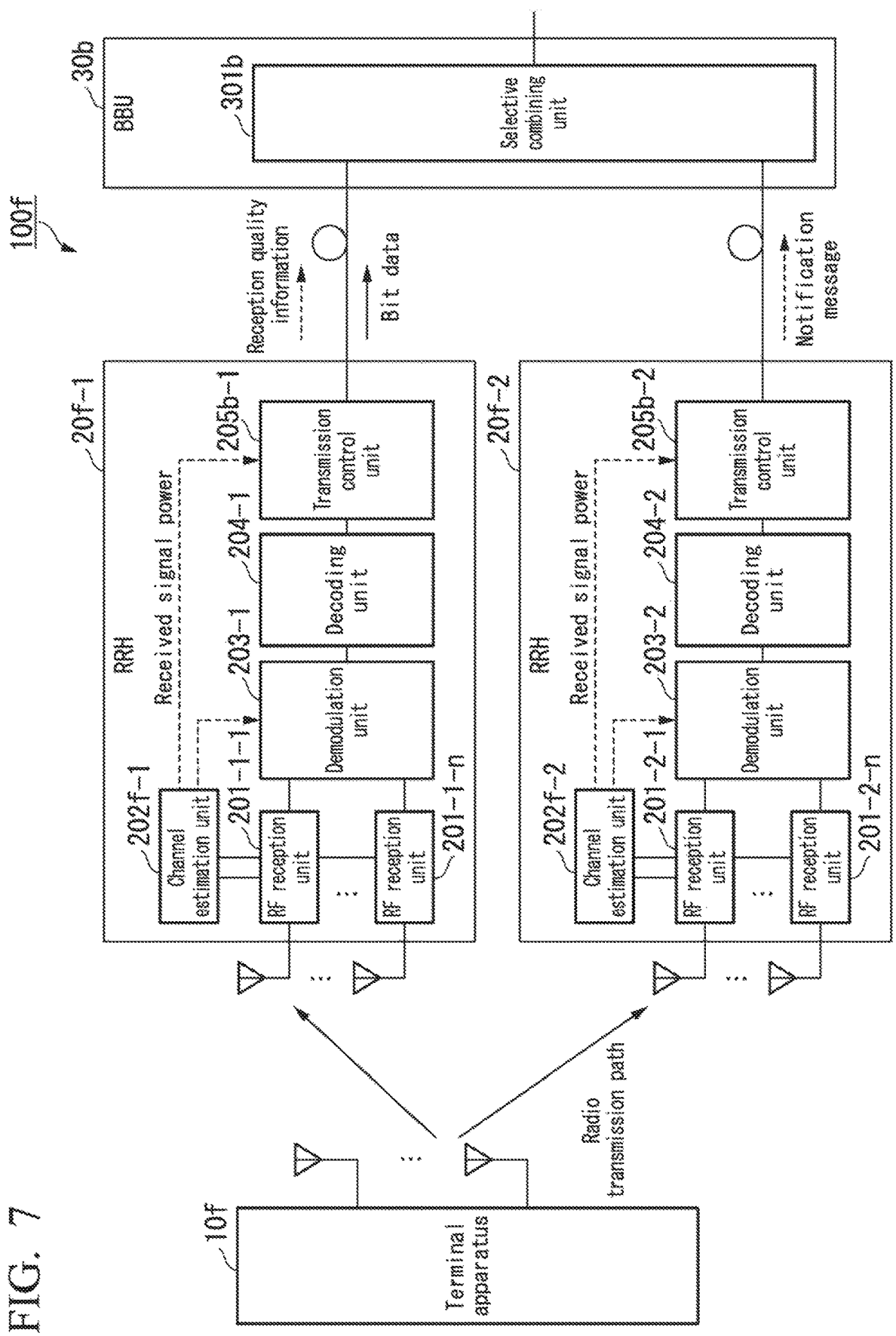
FIG. 7 is a configuration diagram showing the system configuration of a radio communication system 100f according to a seventh embodiment.

FIG. 7 is a configuration diagram showing a system configuration of a radio communication system 100f according to the seventh embodiment. The radio communication system 100f includes a terminal apparatus 10f, multiple RRHs 20f-1 and 20f-2, and a BBU 30b.

In the seventh embodiment, the terminal apparatus 10f and the RRHs 20f are provided with multiple antennas, and MIMO transmissions are performed between the terminal apparatus 10f and the RRHs 20f. In this case, the RRH 20f-1 includes multiple RF reception units 201-1-1 to 201-1-n, a channel estimation unit 202f-1, a demodulation unit 203-1, a decoding unit 204-1, and a transmission control unit 205b-1.

Each of the multiple RF reception units 201-1-1 to 201-1-n is connected to one channel estimation unit 202f-1. The channel estimation unit 202f-1 estimates the channel information and measures the reception quality on the radio transmission path for the signals received by each of the RF reception units 201-1-1 to 201-1-n. It is to be noted that the channel estimation unit 202f-1 may calculate a total received signal power on the basis of reference signals output from the multiple RF reception units 201-1-1 to 201-1-n and output the calculated total received signal power to the transmission control unit 205b-1, or may output the average received signal power to the transmission control unit 205b-1. The operations in the demodulation unit 203-1, the decoding unit 204-1, and the transmission control unit 205b-1 are similar to those in the functional units having the same names in the third embodiment. Additionally, the BBU 30b in the seventh embodiment has a structure similar to that of the BBU 30b in the third embodiment, so the description thereof will be omitted.

With the radio communication system 100f configured in the above manner, it is possible to obtain advantageous effects similar to those of the third embodiment.

Additionally, with the radio communication system 100f, it becomes possible to reduce the transmission data volume between the RRHs 20f and the BBU 30b even for MIMO transmission.

Eighth Embodiment

Figure 8:
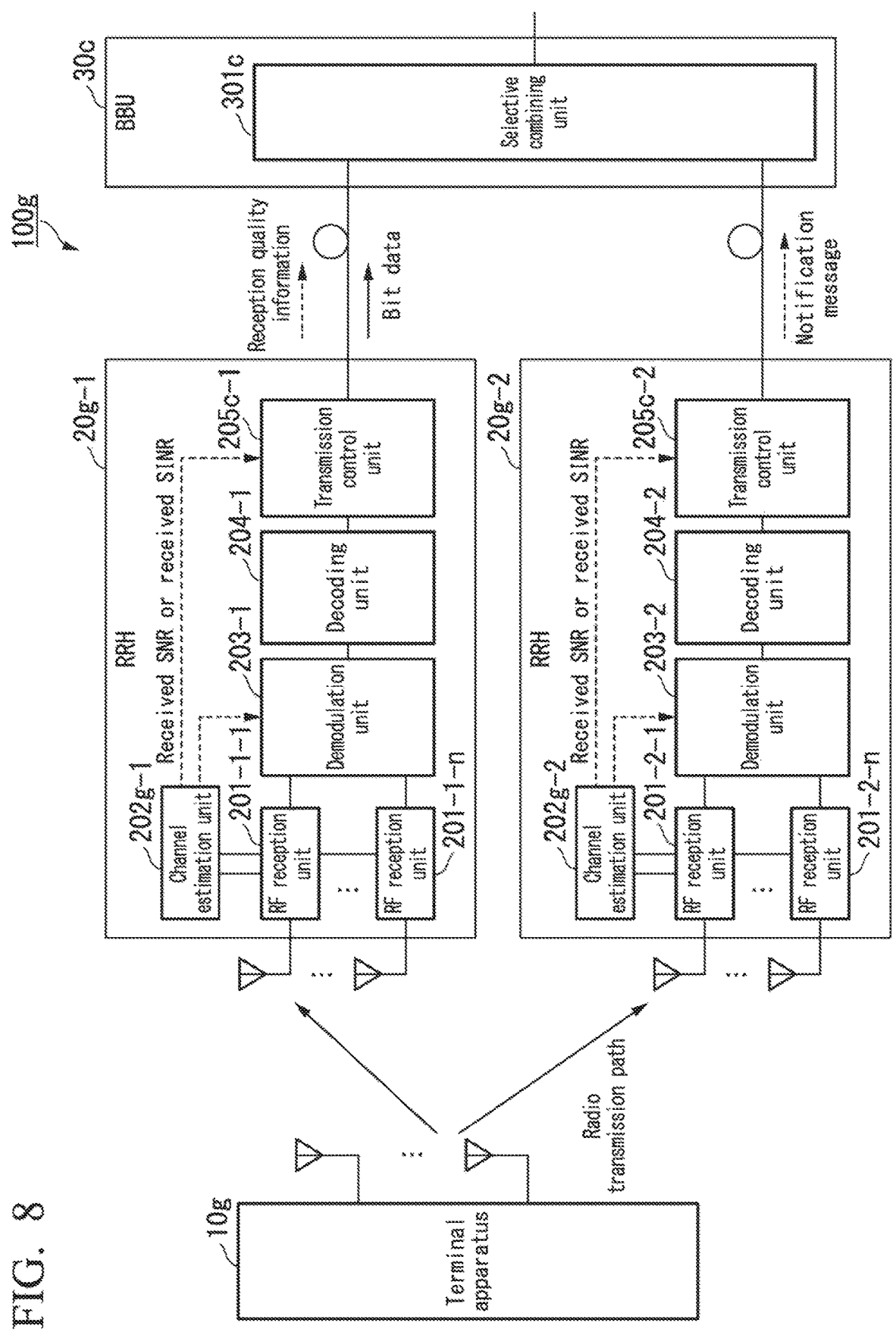
FIG. 8 is a configuration diagram showing the system configuration of a radio communication system 100g according to an eighth embodiment.

FIG. 8 is a configuration diagram showing a system configuration of a radio communication system 100g according to the eighth embodiment. The radio communication system 100g includes a terminal apparatus 10g, multiple RRHs 20g-1 and 20g-2, and a BBU 30c.

In the eighth embodiment, the terminal apparatus 10g and the RRHs 20g are provided with multiple antennas, and MIMO transmissions are performed between the terminal apparatus 10g and the RRHs 20g. In this case, the RRH 20g-1 includes multiple RF reception units 201-1-1 to 201-1-n, a channel estimation unit 202g-1, a demodulation unit 203-1, a decoding unit 204-1, and a transmission control unit 205c-1.

Each of the multiple RF reception units 201-1-1 to 201-1-n is connected to one channel estimation unit 202g-1. The channel estimation unit 202g-1 estimates the channel information and measures the reception quality on the radio transmission path for the signals received by each of the RF reception units 201-1-1 to 201-1-n. It is to be noted that the channel estimation unit 202g-1 may calculate a total received SNR on the basis of reference signals output from the multiple RF reception units 201-1-1 to 201-1-n and output the calculated total received SNR to the transmission control unit 205c-1, or may output the average received SNR to the transmission control unit 205c-1. The operations in the demodulation unit 203-1, the decoding unit 204-1, and the transmission control unit 205c-1 are similar to those in the functional units having the same names in the fourth embodiment. Additionally, the BBU 30c in the eighth embodiment has a structure similar to that of the BBU 30c in the fourth embodiment, so the description thereof will be omitted.

With the radio communication system 100g configured in the above manner, it is possible to obtain advantageous effects similar to those of the fourth embodiment.

Additionally, with the radio communication system 100g, it becomes possible to reduce the transmission data volume between the RRHs 20g and the BBU 30c even for MIMO transmission.

Modified Examples

The eighth embodiment may be modified in a manner similar to the fourth embodiment.

Additionally, if the received SINR is measured as the reception quality, rather than the received SNR, then the channel estimation unit 202g-1 may calculate a total received SINR on the basis of the reference signals output from the multiple RF reception units 201-1-1 to 201-1-n and output the calculated total received SINR to the transmission control unit 205c-1, or may output the average received SINR to the transmission control unit 205c-1.

Ninth Embodiment

Figure 9:
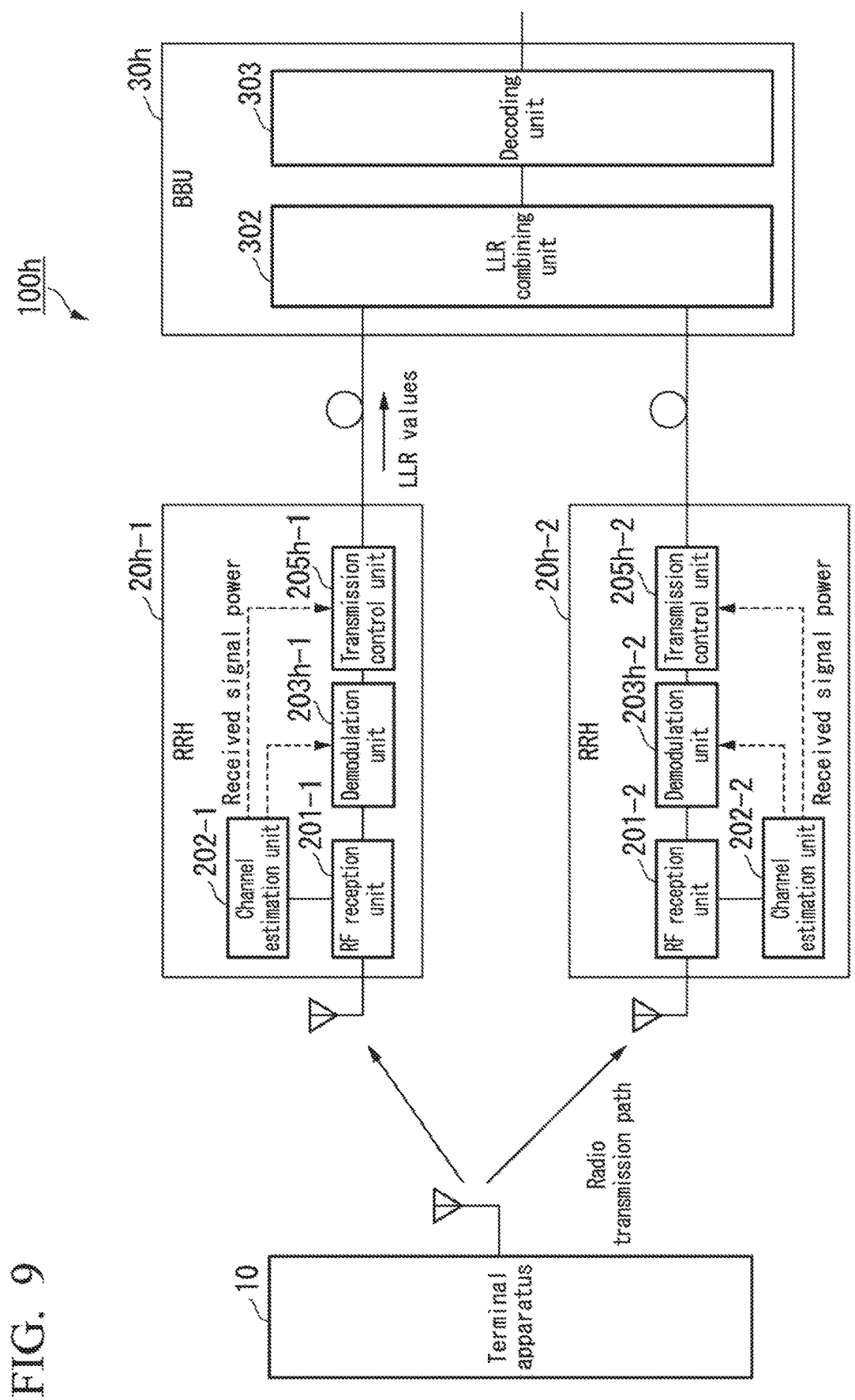
FIG. 9 is a configuration diagram showing the system configuration of a radio communication system 100h according to a ninth embodiment.

FIG. 9 is a configuration diagram showing a system configuration of a radio communication system 100h according to the ninth embodiment. The radio communication system 100h includes a terminal apparatus 10, multiple RRHs 20h-1 and 20h-2, and a BBU 30h. It is to be noted that in the following description, when making no particular distinction between the RRHs 20h-1 and 20h-2, they will be described as RRHs 20h. The RRHs 20h and the BBU 30h function as a base station. The RRHs 20h-1 and 20h-2 and the BBU 30h are communicably connected by wire (for example, optical fiber or coaxial cable). Since the RRHs 20h-1 and 20h-2 have similar structures, the RRH 20h-1 will be explained as an example.

The RRH 20h-1 includes an RF reception unit 201-1, a channel estimation unit 202-1, a demodulation unit 203h-1, and a transmission control unit 205h-1.

The structure of the RRH 20h-1 differs from that of the RRH 20-1 in that a demodulation unit 203h-1 and a transmission control unit 205h-1 are provided instead of the demodulation unit 203-1 and the transmission control unit 205-1, and the decoding unit 204-1 is not provided. The structure of the RRH 20h-1 is otherwise the same as that of the RRH 20-1. For this reason, the description of the RRH 20h-1 overall will be omitted, and the demodulation unit 203h-1 and the transmission control unit 205h-1 will be described.

The demodulation unit 203h-1 takes, as inputs, the data signals output from the RF reception unit 201-1 and the channel information estimation result and the reception quality measurement result output from the channel estimation unit 202-1. The demodulation unit 203h-1 uses the input channel information estimation result and reception quality measurement result to obtain LLR values (soft decision values) by performing equalization and soft-decision demodulation on the input data signals. The demodulation unit 203h-1 outputs the obtained LLR values (soft decision values) to the transmission control unit 205h-1.

The transmission control unit 205h-1 takes, as inputs, the LLR values (soft decision values) output from the demodulation unit 203h-1 and the reception quality measurement result output from the channel estimation unit 202-1. The transmission control unit 205h-1 controls the transmission of the LLR values in accordance with the input reception quality measurement result. Specifically, the transmission control unit 205h-1 initially compares the received signal power, which is the input measurement result, with a first threshold value. Next, if the received signal power is less than the first threshold value, then the transmission control unit 205h-1 discards the LLR values. On the other hand, if the received signal power is greater than or equal to the first threshold value, then the transmission control unit 205h-1 transmits the LLR values to the BBU 30h.

FIG. 9 shows the case in which the received signal power in the RRH 20h-1 is greater than or equal to the first threshold value, and the received signal power in the RRH 20h-2 is less than the first threshold value. In this case, the transmission control unit 205h-1 in the RRH 20h-1 transmits the LLR values to the BBU 30h, and the transmission control unit 205h-2 in the RRH 20h-2 discards the LLR values without transmission to the BBU 30h.

The BBU 30h includes an LLR combining unit 302 and a decoding unit 303.

The LLR combining unit 302 receives the LLR values transmitted from the RRHs 20h. The LLR combining unit 302 combines the received LLR values and outputs the combined LLR values to the decoding unit 303.

The decoding unit 303 takes, as an input, the combined LLR values output from the LLR combining unit 302. The decoding unit 303 decodes the combined LLR values that have been input and thereby restores the signal bit data (hard decision values). The decoding unit 303 outputs the restored signal bit data.

With the radio communication system 100h configured in the above manner, the RRHs 20h control the transmission of LLR values in accordance with the received signal power of signals transmitted from the terminal apparatus 10. For example, the RRHs 20h do not transmit, to the BBU 30h, LLR values that do not contribute to the improvement of the radio transmission characteristics, such as LLR values obtained from signals having a received signal power that is less than the first threshold value. As a result thereof, in comparison with conventional systems, the number of LLR values transmitted to the BBU 30h is decreased. For this reason, it becomes possible to reduce the total transmission data volume between the multiple RRHs and the BBU.

Tenth Embodiment

Figure 10:
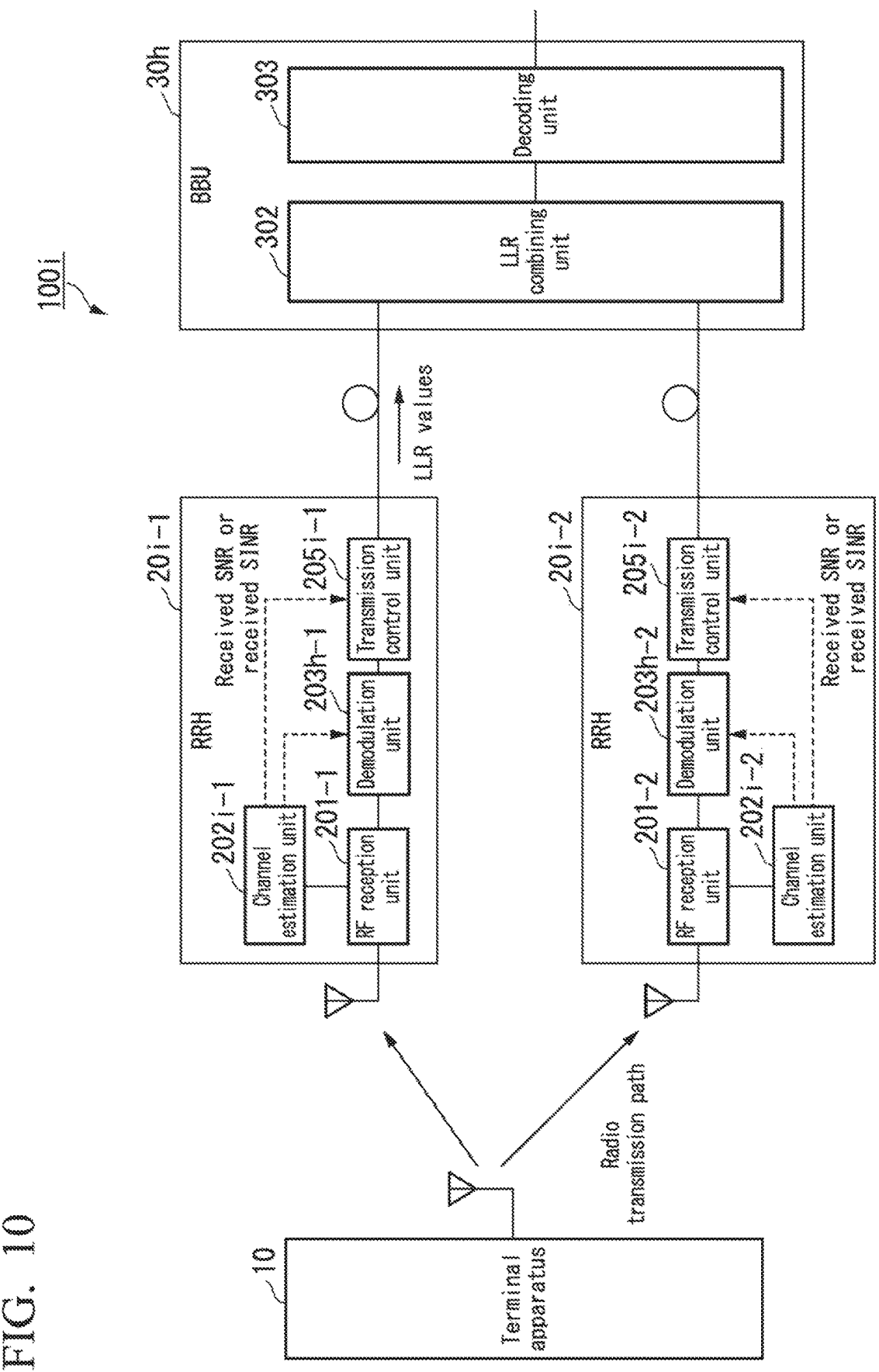
FIG. 10 is a configuration diagram showing the system configuration of a radio communication system 100i according to a tenth embodiment.

FIG. 10 is a configuration diagram showing a system configuration of a radio communication system 100i according to the tenth embodiment. The radio communication system 100i includes a terminal apparatus 10, multiple RRHs 20i-1 and 20i-2, and a BBU 30h. It is to be noted that in the following description, when making no particular distinction between the RRHs 20i-1 and 20i-2, they will be described as RRHs 20i. The RRHs 20i and the BBU 30h function as a base station. The RRHs 20i-1 and 20i-2 and the BBU 30h are communicably connected by wire (for example, optical fiber or coaxial cable). Since the RRHs 20i-1 and 20i-2 have similar structures, the RRH 20i-1 will be explained as an example.

The RRH 20i-1 includes an RF reception unit 201-1, a channel estimation unit 202i-1, a demodulation unit 203h-1, and a transmission control unit 205i-1.

The structure of the RRH 20i-1 differs from that of the RRH 20h-1 in that a channel estimation unit 202i-1 and a transmission control unit 205i-1 are provided instead of the channel estimation unit 202-1 and the transmission control unit 205h-1. The structure of the RRH 20i-1 is otherwise the same as that of the RRH 20h-1. For this reason, the description of the RRH 20i-1 overall will be omitted, and the channel estimation unit 202i-1 and the transmission control unit 205i-1 will be described.

The channel estimation unit 202i-1 takes, as inputs, the reference signals output from the RF reception unit 201-1. The channel estimation unit 202i-1 estimates the channel information and measures the reception quality on the radio transmission path on the basis of the input reference signals. For example, the channel estimation unit 202i-1 measures, as the reception quality, the received SNR of the signals received in the RF reception unit 201-1. The channel estimation unit 202i-1 outputs the estimated channel information and the reception quality measurement result to the demodulation unit 203h-1. Additionally, the channel estimation unit 202i-1 outputs the reception quality measurement result to the transmission control unit 205i-1.

The transmission control unit 205i-1 takes, as inputs, the LLR values (soft decision values) output from the demodulation unit 203h-1 and the reception quality measurement result output from the channel estimation unit 202i-1. The transmission control unit 205i-1 controls the transmission of the LLR values in accordance with the input reception quality measurement result. Specifically, the transmission control unit 205i-1 initially compares the received SNR, which is the input measurement result, with a second threshold value. Next, if the received SNR is less than the second threshold value, then the transmission control unit 205i-1 discards the LLR values. On the other hand, if the received SNR is greater than or equal to the second threshold value, then the transmission control unit 205i-1 transmits the LLR values to the BBU 30h.

With the radio communication system 100i configured in the above manner, the RRHs 20i control the transmission of LLR values in accordance with the received SNR of signals transmitted from the terminal apparatus 10. For example, the RRHs 20i do not transmit, to the BBU 30h, LLR values that do not contribute to the improvement of the radio transmission characteristics, such as LLR values obtained from signals having a received SNR that is less than the second threshold value. As a result thereof, in comparison with conventional systems, the number of LLR values transmitted to the BBU 30h is decreased. For this reason, it becomes possible to reduce the total transmission data volume between the multiple RRHs and the BBU.

Modified Example

The channel estimation unit 202i-1 may measure the received SINR, rather than the received SNR, as the reception quality. When the RRHs 20i-1 are configured in this way, the transmission control unit 205i-1 compares the received SINR, which is the input measurement result, with a third threshold value for determining the received SINR. Next, if the received SINR is less than the third threshold value, then the transmission control unit 205i-1 discards the LLR values. On the other hand, if the received SINR is greater than or equal to the third threshold value, then the transmission control unit 205i-1 transmits the LLR values to the BBU 30h.

Eleventh Embodiment

Figure 11:
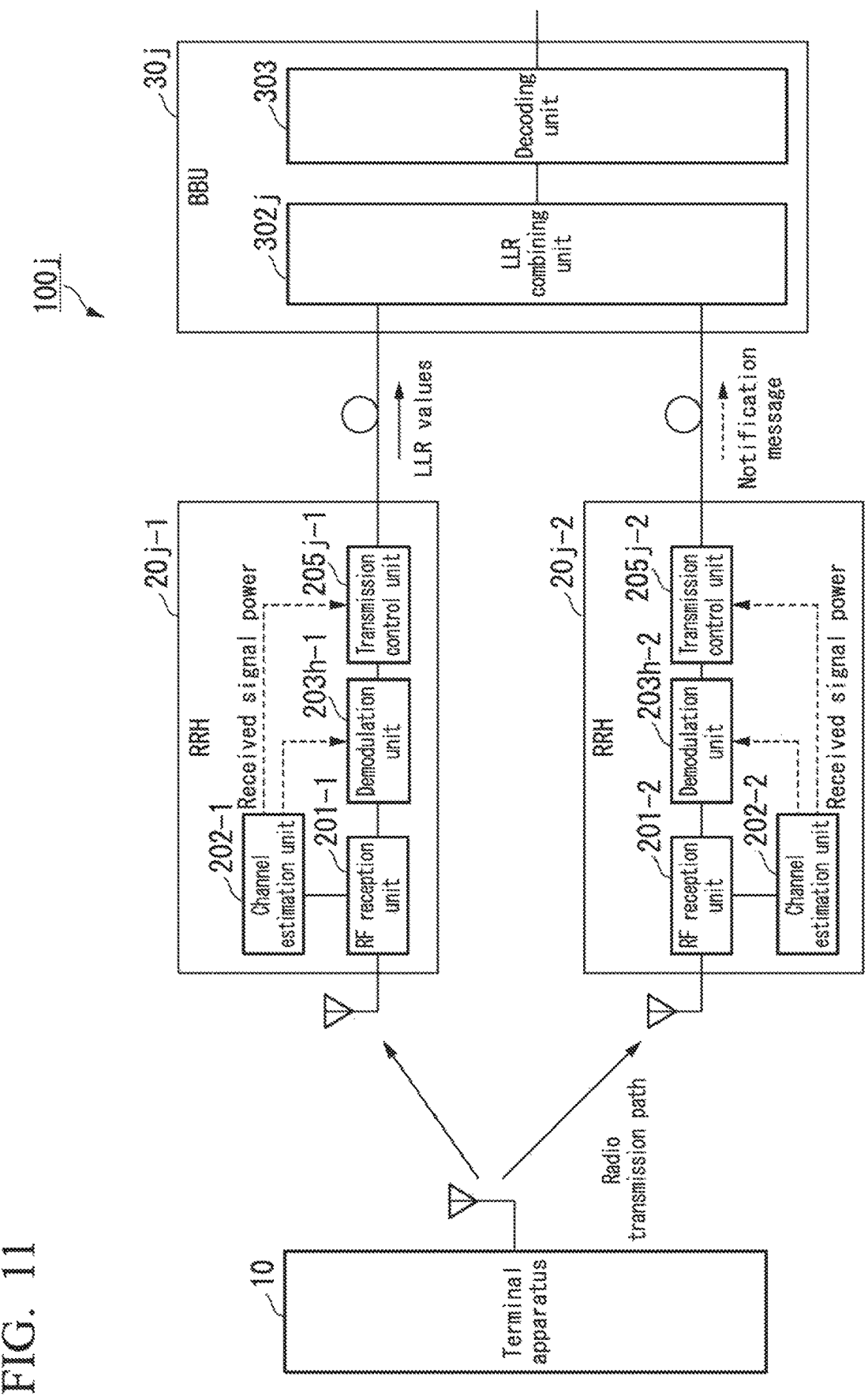
FIG. 11 is a configuration diagram showing the system configuration of a radio communication system 100j according to an eleventh embodiment.

FIG. 11 is a configuration diagram showing a system configuration of a radio communication system 100j according to the eleventh embodiment. The radio communication system 100j includes a terminal apparatus 10, multiple RRHs 20j-1 and 20j-2, and a BBU 30j. It is to be noted that in the following description, when making no particular distinction between the RRHs 20j-1 and 20j-2, they will be described as RRHs 20j. The RRHs 20j and the BBU 30j function as a base station. The RRHs 20j-1 and 20j-2 and the BBU 30j are communicably connected by wire (for example, optical fiber or coaxial cable). Since the RRHs 20j-1 and 20j-2 have similar structures, the RRH 20j-1 will be explained as an example.

The RRH 20j-1 includes an RF reception unit 201-1, a channel estimation unit 202-1, a demodulation unit 203h-1, and a transmission control unit 205j-1.

The structure of the RRH 20j-1 differs from that of the RRH 20h-1 in that a transmission control unit 205j-1 is provided instead of the transmission control unit 205h-1. The structure of the RRH 20j-1 is otherwise the same as that of the RRH 20h-1. For this reason, the description of the RRH 20j-1 overall will be omitted, and the transmission control unit 205j-1 will be described.

The transmission control unit 205j-1 takes, as inputs, the LLR values (soft decision values) output from the demodulation unit 203h-1 and the reception quality measurement result output from the channel estimation unit 202-1. The transmission control unit 205j-1 controls the transmission of the LLR values in accordance with the input reception quality measurement result. Specifically, the transmission control unit 205j-1 initially compares the received signal power, which is the input measurement result, with a first threshold value. Next, if the received signal power is less than the first threshold value, then the transmission control unit 205j-1 discards the LLR values, and also generates a notification message indicating that the LLR values will not be transmitted, and transmits the generated notification message to the BBU 30j. On the other hand, if the received signal power is greater than or equal to the first threshold value, then the transmission control unit 205j-1 transmits the LLR values to the BBU 30j.

The BBU 30j includes an LLR combining unit 302j and a decoding unit 303.

The LLR combining unit 302j receives the LLR values transmitted from the RRHs 20j. The LLR combining unit 302j combines the received LLR values and outputs the combined LLR values to the decoding unit 303. Additionally, the LLR combining unit 302j receives the notification messages transmitted by the RRHs 20j.

With the radio communication system 100j configured in the above manner, it is possible to obtain advantageous effects similar to those of the ninth embodiment.

Additionally, if the received signal power of the received signals is less than the first threshold value, then the RRHs 20j transmit, to the BBU 30j, a notification message indicating that the LLR values will not be transmitted. As a result thereof, the BBU 30j can recognize whether or not information has been received from all of the cooperating RRHs 20j, thereby allowing for a reduction in the time spent in waiting for reception.

Modified Example

The BBU 30j may be configured so as to transmit, to all cooperating RRHs 20j, a message providing notification that reception has been completed when the signals received from one of the RRHs 20j have been received without error.

Twelfth Embodiment

Figure 12:
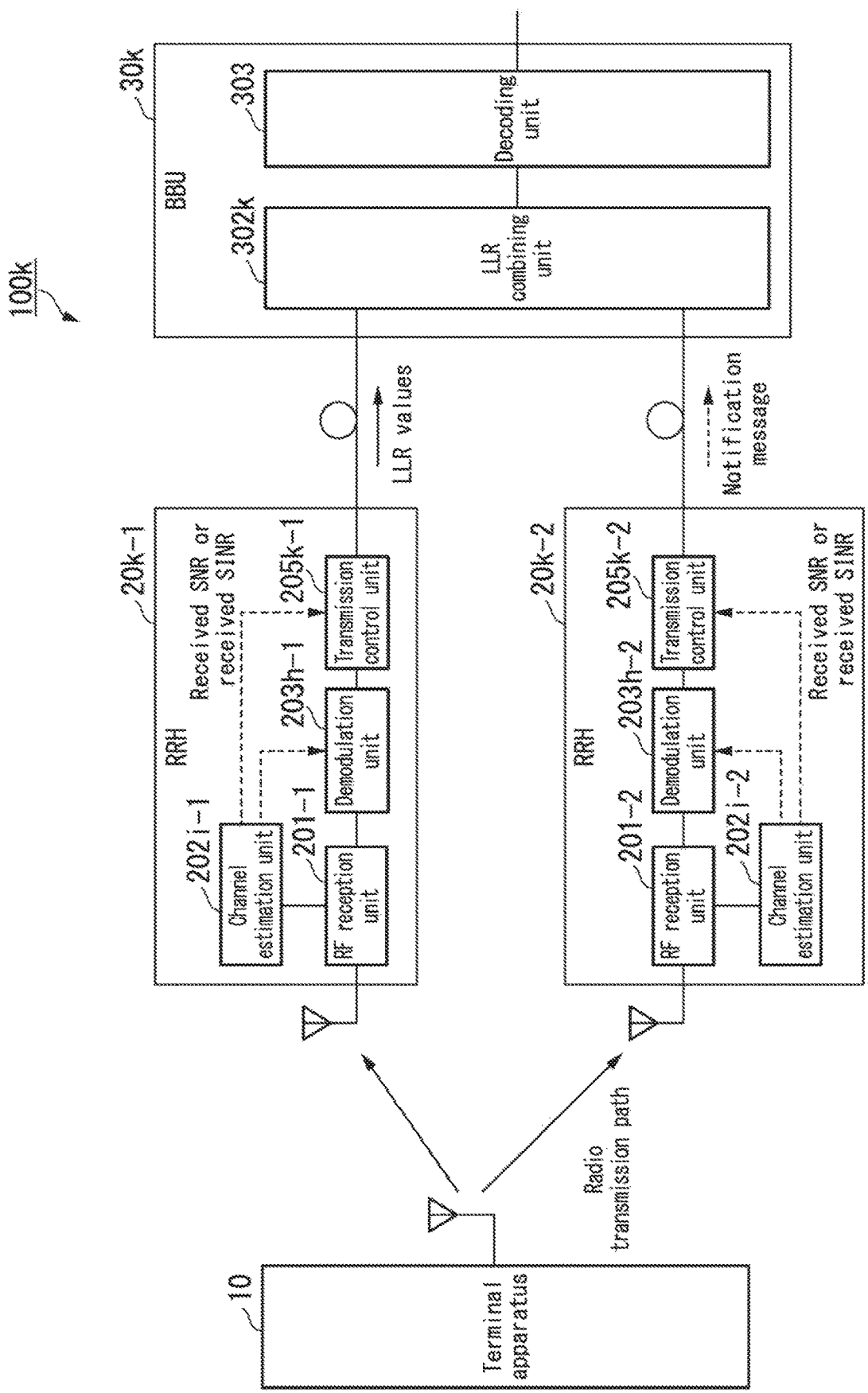
FIG. 12 is a configuration diagram showing the system configuration of a radio communication system 100k according to a twelfth embodiment.

FIG. 12 is a configuration diagram showing a system configuration of a radio communication system 100k according to the twelfth embodiment. The radio communication system 100k includes a terminal apparatus 10, multiple RRHs 20k-1 and 20k-2, and a BBU 30k. It is to be noted that in the following description, when making no particular distinction between the RRHs 20k-1 and 20k-2, they will be described as RRHs 20k. The RRHs 20k and the BBU 30k function as a base station. The RRHs 20k-1 and 20k-2 and the BBU 30k are communicably connected by wire (for example, optical fiber or coaxial cable). Since the RRHs 20k-1 and 20k-2 have similar structures, the RRH 20k-1 will be explained as an example.

The RRH 20k-1 includes an RF reception unit 201-1, a channel estimation unit 202i-1, a demodulation unit 203h-1, and a transmission control unit 205k-1.

The structure of the RRH 20k-1 differs from that of the RRH 20i-1 in that a transmission control unit 205k-1 is provided instead of the transmission control unit 205i-1. The structure of the RRH 20k-1 is otherwise the same as that of the RRH 20i-1. For this reason, the description of the RRH 20k-1 overall will be omitted, and the transmission control unit 205k-1 will be described.

The transmission control unit 205k-1 takes, as inputs, the LLR values (soft decision values) output from the demodulation unit 203h-1 and the reception quality measurement result output from the channel estimation unit 202i-1. The transmission control unit 205k-1 controls the transmission of the LLR values in accordance with the input reception quality measurement result. Specifically, the transmission control unit 205k-1 initially compares the received SNR, which is the input measurement result, with a second threshold value. Next, if the received SNR is less than the second threshold value, then the transmission control unit 205k-1 discards the LLR values, and also generates a notification message indicating that the LLR values will not be transmitted, and transmits the generated notification message to the BBU 30k. On the other hand, if the received SNR is greater than or equal to the second threshold value, then the transmission control unit 205k-1 transmits the LLR values to the BBU 30k.

The BBU 30k includes an LLR combining unit 302k and a decoding unit 303.

The LLR combining unit 302k receives the LLR values transmitted from the RRHs 20k. The LLR combining unit 302k combines the received LLR values and outputs the combined LLR values to the decoding unit 303. Additionally, the LLR combining unit 302k receives the notification messages transmitted by the RRHs 20k.

With the radio communication system 100k configured in the above manner, it is possible to obtain advantageous effects similar to those of the tenth embodiment.

Additionally, if the received SNR of the received signals is less than the second threshold value, then the RRHs 20k transmit, to the BBU 30k, a notification message indicating that the LLR values will not be transmitted. As a result thereof, the BBU 30k can recognize whether or not information has been received from all of the cooperating RRHs 20k, thereby allowing for a reduction in the time spent in waiting for reception.

Modified Examples

The channel estimation unit 202i-1 may measure the received SINR, rather than the received SNR, as the reception quality. When the RRHs 20k-1 are configured in this way, the transmission control unit 205k-1 compares the received SINR, which is the input measurement result, with a third threshold value. Next, if the received SINR is less than the third threshold value, then the transmission control unit 205k-1 discards the LLR values, and also generates a notification message indicating that the LLR values will not be transmitted, and transmits the generated notification message to the BBU 30k. On the other hand, if the received SINR is greater than or equal to the third threshold value, then the transmission control unit 205k-1 transmits the LLR values to the BBU 30k.

The BBU 30k may be configured so as to transmit, to all cooperating RRHs 20k, a message providing notification that reception has been completed when the signals (for example, the LLR values or the notification message) received from one of the RRHs 20k have been received without error.

Thirteenth Embodiment

Figure 13:
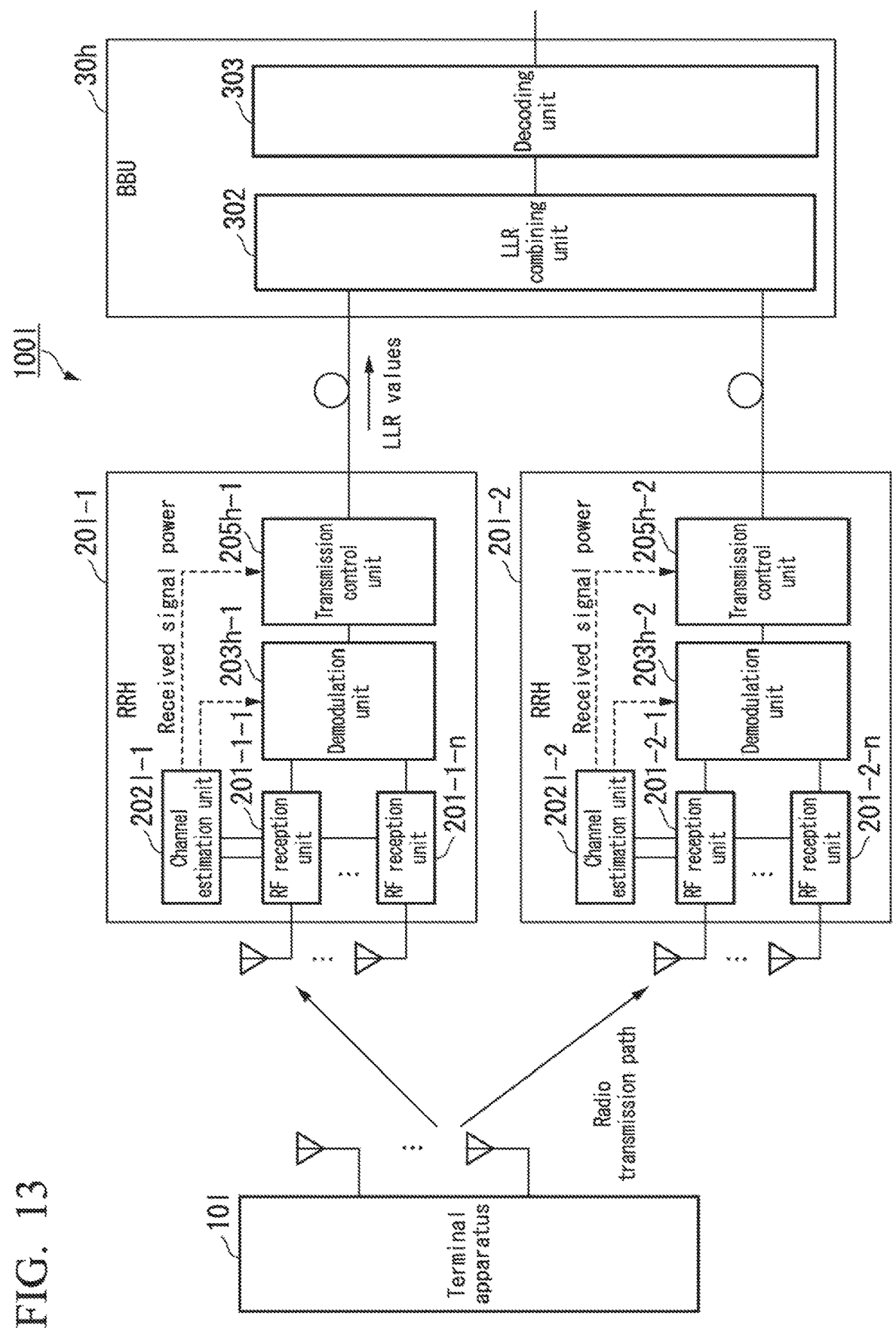
FIG. 13 is a configuration diagram showing the system configuration of a radio communication system 100l according to a thirteenth embodiment.

FIG. 13 is a configuration diagram showing a system configuration of a radio communication system 100l according to the thirteenth embodiment. The radio communication system 100l includes a terminal apparatus 10l, multiple RRHs 20l-1 and 20l-2, and a BBU 30h.

In the thirteenth embodiment, the terminal apparatus 10l and the RRHs 20l are provided with multiple antennas, and MIMO transmissions are performed between the terminal apparatus 10l and the RRHs 20l. In this case, the RRH 20l-1 includes multiple RF reception units 201-1-1 to 201-1-n, a channel estimation unit 202l-1, a demodulation unit 203h-1, and a transmission control unit 205h-1.

Each of the multiple RF reception units 201-1-1 to 201-1-n is connected to one channel estimation unit 202l-1. The channel estimation unit 202l-1 estimates the channel information and measures the reception quality on the radio transmission path for the signals received by each of the RF reception units 201-1-1 to 201-1-n. It is to be noted that the channel estimation unit 202l-1 may calculate a total received signal power on the basis of reference signals output from the multiple RF reception units 201-1-1 to 201-1-n and output the calculated total received signal power to the transmission control unit 205h-1, or may output the average received signal power to the transmission control unit 205h-1. The operations in the demodulation unit 203h-1 and the transmission control unit 205h-1 are similar to those in the functional units having the same names in the ninth embodiment. Additionally, the BBU 30h in the thirteenth embodiment has a structure similar to that of the BBU 30h in the ninth embodiment, so the description thereof will be omitted.

With the radio communication system 100l configured in the above manner, it is possible to obtain advantageous effects similar to those of the ninth embodiment.

Additionally, with the radio communication system 100l, it becomes possible to reduce the transmission data volume between the RRHs 20l and the BBU 30h even for MIMO transmission.

Fourteenth Embodiment

Figure 14:
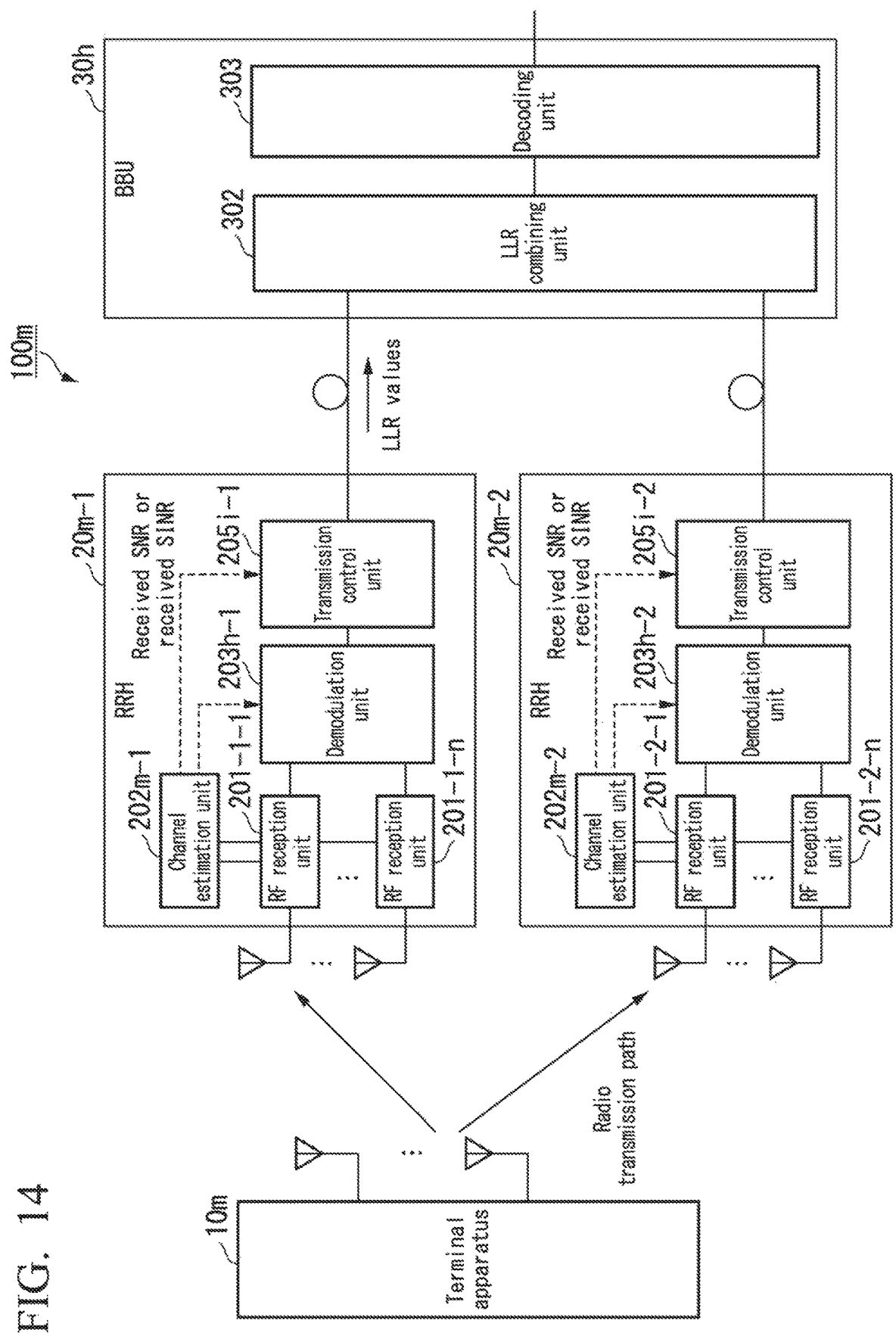
FIG. 14 is a configuration diagram showing the system configuration of a radio communication system 100m according to a fourteenth embodiment.

FIG. 14 is a configuration diagram showing a system configuration of a radio communication system 100m according to the fourteenth embodiment. The radio communication system 100m includes a terminal apparatus 10m, multiple RRHs 20m-1 and 20m-2, and a BBU 30h.

In the fourteenth embodiment, the terminal apparatus 10m and the RRHs 20m are provided with multiple antennas, and MIMO transmissions are performed between the terminal apparatus 10m and the RRHs 20m. In this case, the RRH 20*m*-1 includes multiple RF reception units 201-1-1 to 201-1-*n*, a channel estimation unit 202*m*-1, a demodulation unit 203*h*-1, and a transmission control unit 205*i*-1.

Each of the multiple RF reception units 201-1-1 to 201-1-*n* is connected to one channel estimation unit 202*m*-1. The channel estimation unit 202*m*-1 estimates the channel information and measures the reception quality on the radio transmission path for the signals received by each of the RF reception units 201-1-1 to 201-1-*n*. It is to be noted that the channel estimation unit 202*m*-1 may calculate a total received SNR on the basis of reference signals output from the multiple RF reception units 201-1-1 to 201-1-*n* and output the calculated total received SNR to the transmission control unit 205*i*-1, or may output the average received SNR to the transmission control unit 205*i*-1. The operations in the demodulation unit 203*h*-1 and the transmission control unit 205*i*-1 are similar to those in the functional units having the same names in the tenth embodiment. Additionally, the BBU 30*h* in the fourteenth embodiment has a structure similar to that of the BBU 30*h* in the tenth embodiment, so the description thereof will be omitted.

With the radio communication system 100*m* configured in the above manner, it is possible to obtain advantageous effects similar to those of the tenth embodiment.

Additionally, with the radio communication system 100*m*, it becomes possible to reduce the transmission data volume between the RRHs 20*m* and the BBU 30*h* even for MIMO transmission.

Modified Examples

The fourteenth embodiment may be modified in a manner similar to the tenth embodiment.

Additionally, if the received SINR is measured as the reception quality, rather than the received SNR, then the channel estimation unit 202*m*-1 may calculate a total received SINR on the basis of the reference signals output from the multiple RF reception units 201-1-1 to 201-1-*n* and output the calculated total received SINR to the transmission control unit 205*i*-1, or may output the average received SINR to the transmission control unit 205*i*-1.

Fifteenth Embodiment

Figure 15:
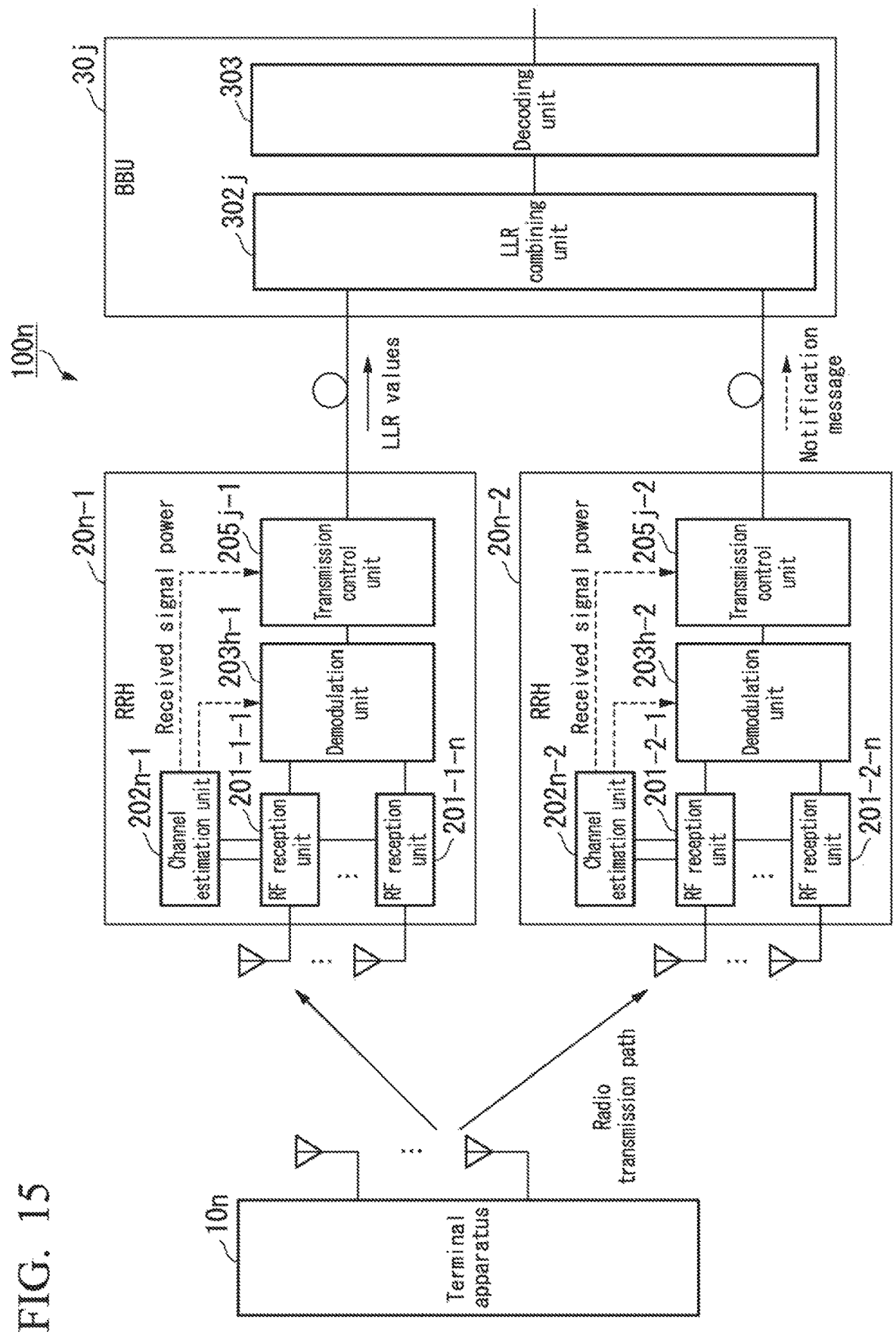
FIG. 15 is a configuration diagram showing the system configuration of a radio communication system 100n according to a fifteenth embodiment.

FIG. 15 is a configuration diagram showing a system configuration of a radio communication system 100*n* according to the fifteenth embodiment. The radio communication system 100*n* includes a terminal apparatus 10*n*, multiple RRHs 20*n*-1 and 20*n*-2, and a BBU 30*j*.

In the fifteenth embodiment, the terminal apparatus 10*n* and the RRHs 20*n* are provided with multiple antennas, and MIMO transmissions are performed between the terminal apparatus 10*n* and the RRHs 20*n*. In this case, the RRH 20*n*-1 includes multiple RF reception units 201-1-1 to 201-1-*n*, a channel estimation unit 202*n*-1, a demodulation unit 203*h*-1, and a transmission control unit 205*j*-1.

Each of the multiple RF reception units 201-1-1 to 201-1-*n* is connected to one channel estimation unit 202*n*-1. The channel estimation unit 202*n*-1 estimates the channel information and measures the reception quality on the radio transmission path for the signals received by each of the RF reception units 201-1-1 to 201-1-*n*. It is to be noted that the channel estimation unit 202*n*-1 may calculate a total received signal power on the basis of reference signals output from the multiple RF reception units 201-1-1 to 201-1-*n* and output the calculated total received signal power to the transmission control unit 205*j*-1, or may output the average received signal power to the transmission control unit 205*j*-1. The operations in the demodulation unit 203*h*-1 and the transmission control unit 205*j*-1 are similar to those in the functional units having the same names in the eleventh embodiment. Additionally, the BBU 30*j* in the fifteenth embodiment has a structure similar to that of the BBU 30*j* in the eleventh embodiment, so the description thereof will be omitted.

With the radio communication system 100*n* configured in the above manner, it is possible to obtain advantageous effects similar to those of the eleventh embodiment.

Additionally, with the radio communication system 100*n*, it becomes possible to reduce the transmission data volume between the RRHs 20*n* and the BBU 30*j* even for MIMO transmission.

Sixteenth Embodiment

Figure 16:
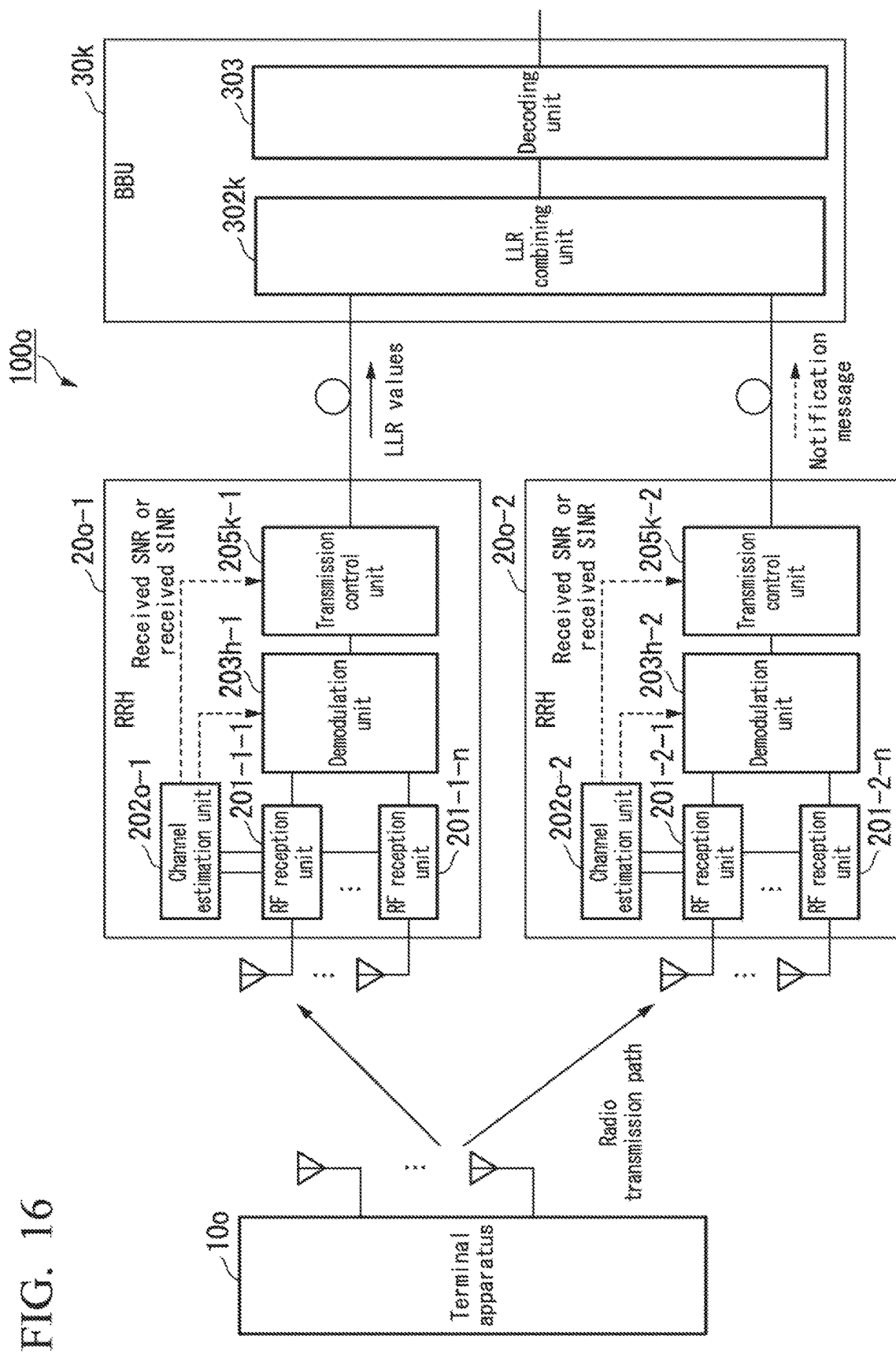
FIG. 16 is a configuration diagram showing the system configuration of a radio communication system 100o according to a sixteenth embodiment.
Figure 17:
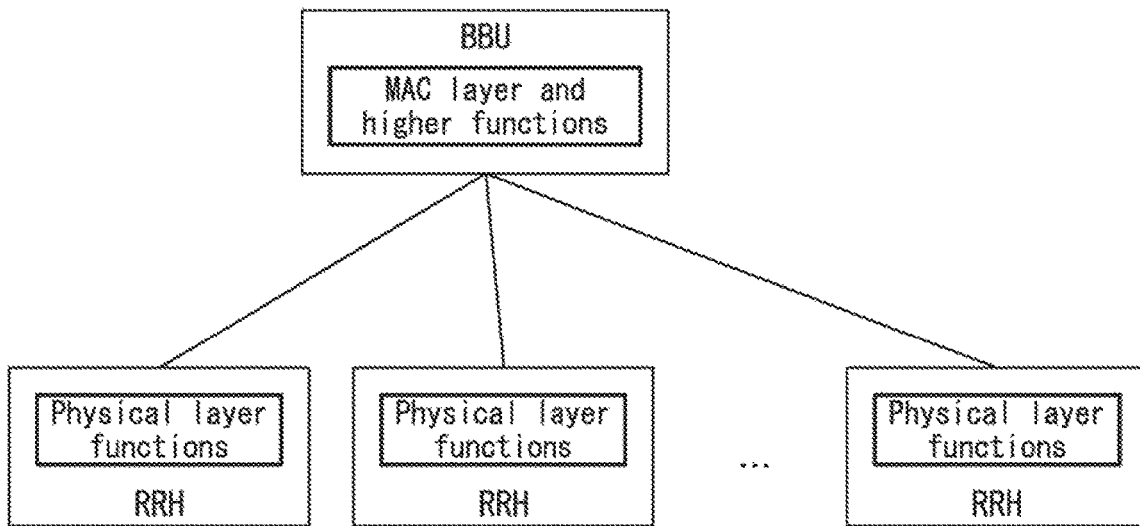
FIG. 17 is a diagram showing an example of a MAC-PHY split functional splitting scheme.
Figure 18:
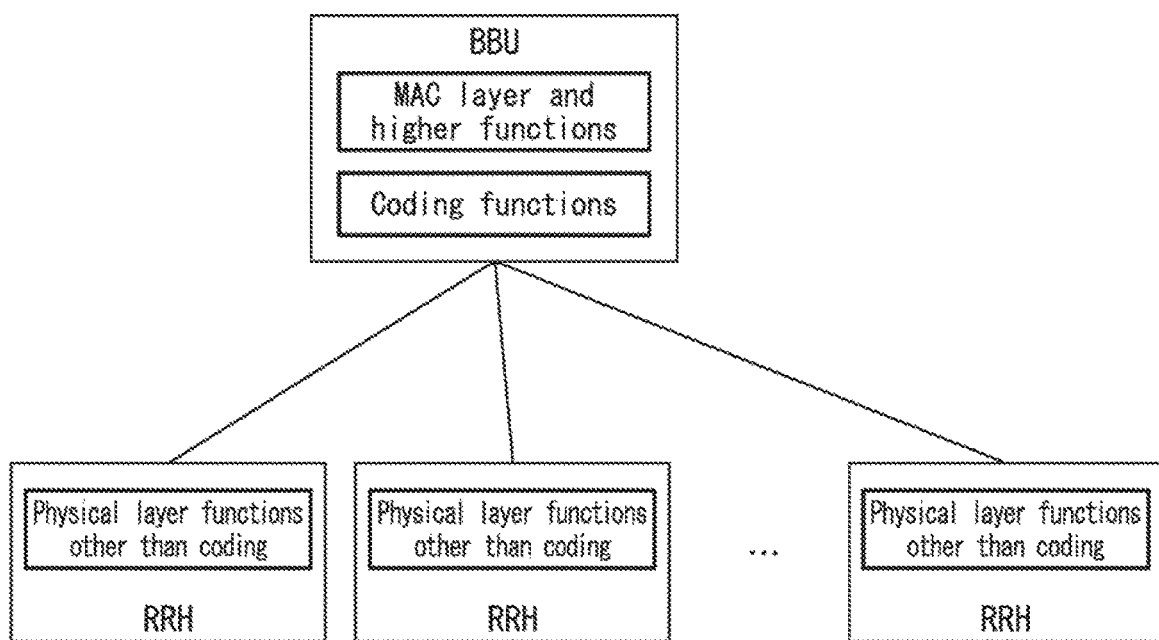
FIG. 18 is a diagram showing an example of an SPP functional splitting scheme.
Figure 19:
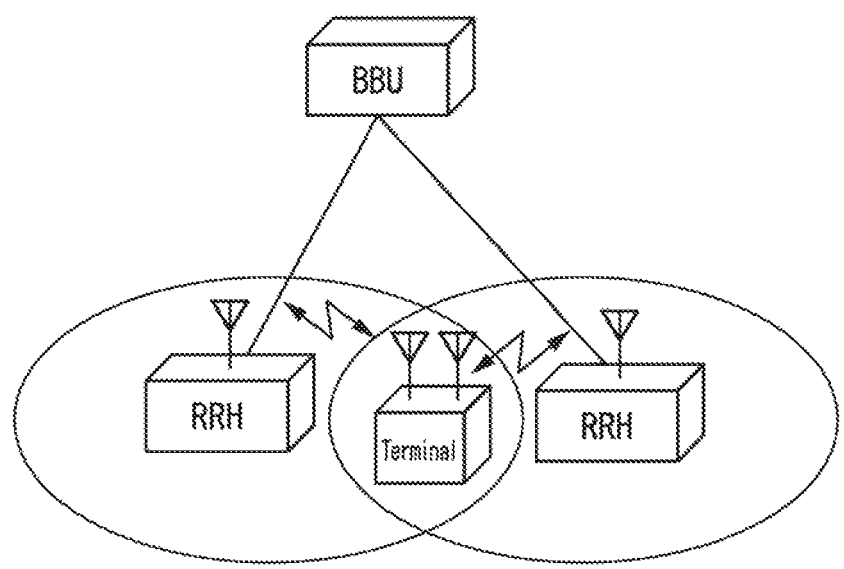
FIG. 19 is a diagram showing a system configuration using CoMP technology.
Figure 20:
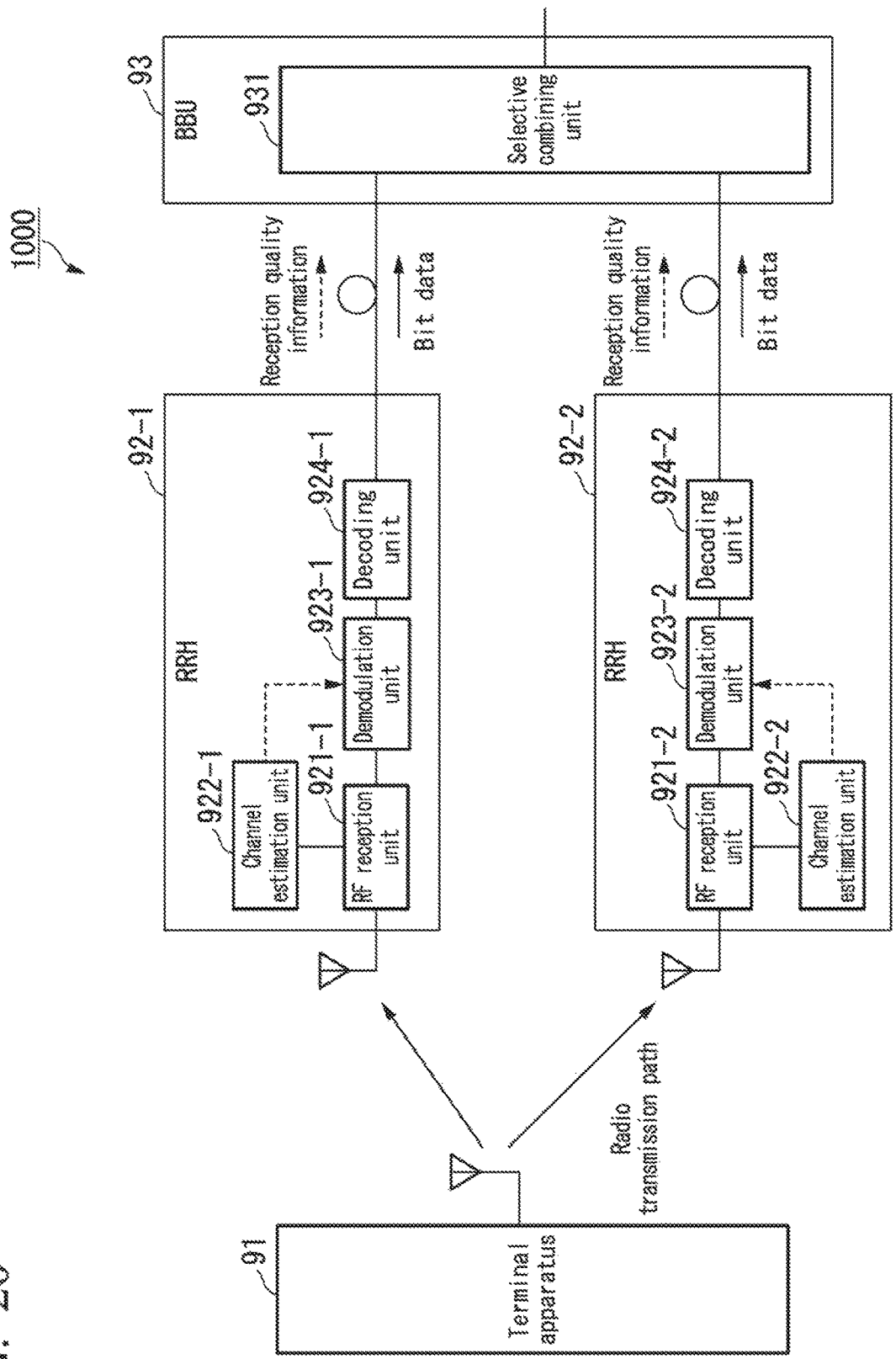
FIG. 20 is a diagram showing an example of a system configuration of a radio communication system 1000 that performs uplink selectively combined signal transmission in a conventional MAC-PHY split.
Figure 21:
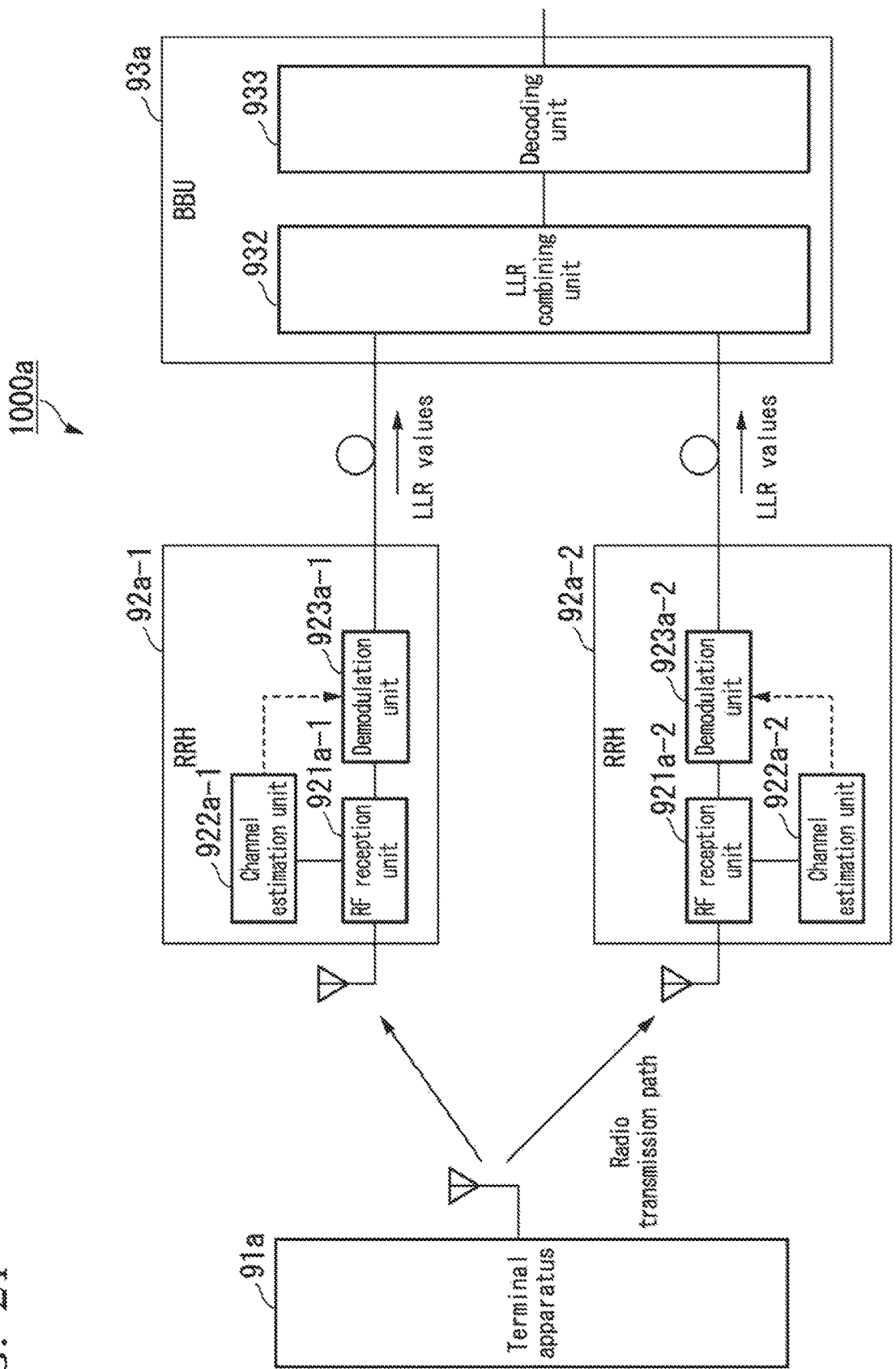
FIG. 21 is a diagram showing an example of a system configuration of a radio communication system 1000a that performs uplink LLR-combined signal transmission in conventional SPP.

FIG. 16 is a configuration diagram showing a system configuration of a radio communication system 100*o* according to the sixteenth embodiment. The radio communication system 100*o* includes a terminal apparatus 10*o*, multiple RRHs 20*o*-1 and 20*o*-2, and a BBU 30*k*.

In the sixteenth embodiment, the terminal apparatus 10*o* and the RRHs 20*o* are provided with multiple antennas, and MIMO transmissions are performed between the terminal apparatus 10*o* and the RRHs 20*o*. In this case, the RRH 20*o*-1 includes multiple RF reception units 201-1-1 to 201-1-*n*, a channel estimation unit 202*o*-1, a demodulation unit 203*h*-1, and a transmission control unit 205*k*-1.

Each of the multiple RF reception units 201-1-1 to 201-1-*n* is connected to one channel estimation unit 202*o*-1. The channel estimation unit 202*o*-1 estimates the channel information and measures the reception quality on the radio transmission path for the signals received by each of the RF reception units 201-1-1 to 201-1-*n*. It is to be noted that the channel estimation unit 202*o*-1 may calculate a total received SNR on the basis of reference signals output from the multiple RF reception units 201-1-1 to 201-1-*n* and output the calculated total received SNR to the transmission control unit 205*k*-1, or may output the average received SNR to the transmission control unit 205*k*-1. The operations in the demodulation unit 203*h*-1 and the transmission control unit 205*k*-1 are similar to those in the functional units having the same names in the twelfth embodiment. Additionally, the BBU 30*k* in the sixteenth embodiment has a structure similar to that of the BBU 30*k* in the twelfth embodiment, so the description thereof will be omitted.

With the radio communication system 100*o* configured in the above manner, it is possible to obtain advantageous effects similar to those of the twelfth embodiment.

Additionally, with the radio communication system 100*o*, it becomes possible to reduce the transmission data volume between the RRHs 20*o* and the BBU 30*k* even for MIMO transmission.

Modified Examples

The sixteenth embodiment may be modified in a manner similar to the twelfth embodiment.

Additionally, if the received SINR is measured as the reception quality, rather than the received SNR, then the channel estimation unit 202*o*-1 may calculate a total received SINR on the basis of the reference signals output from the multiple RF reception units 201-1-1 to 201-1-*n* and output the calculated total received SINR to the transmission control unit 205k-1, or may output the average received SINR to the transmission control unit 205k-1.

Hereinbelow, examples of modifications that are common to all of the embodiments will be explained. Although the RRHs 20 and BBU 30 of the first embodiment will be described as an example here, the RRHs 20 may be replaced with any of the RRHs 20a to RRHs 20o, and the BBU 30 may be replaced with any of the BBU 30a to the BBU 30c, the BBU 30h, the BBU 30j, and the BBU 30k.

In each of the above-described embodiments, it is possible for there to be multiple terminal apparatuses 10. Additionally, in the present embodiments, it is possible for there to be three or more RRHs 20.

The RRHs 20 and the BBU 30 need not be limited to being connected by a point-to-point connection, and they may be networked.

All or some of the RRHs 20, the RRHs 20a to 20o, the BBU 30, the BBUs 30a to BBU 30c, the BBU 30h, the BBU 30j, and the BBU 30k in the aforementioned embodiments may be realized in a computer. For example, it is possible to realize the RRHs and the BBU by recording programs for respectively realizing the constituent elements of the RRHs and the BBU in computer-readable recording media, loading the programs recorded on these recording media in a computer system, and running the programs. It is to be noted that the "computer system" mentioned here includes OSs (Operating Systems) and hardware such as peripheral devices. Additionally, the "computer-readable recording media" refer to portable media such as flexible disks, magneto-optic disks, ROM (Read-Only Memory) and CD (Compact Disc)-ROMs, and also to storage apparatuses, such as hard disks, installed internally in the computer system. Furthermore, the "computer-readable recording media" may include those that dynamically hold the programs for a short time, such as communication cables when the programs are transmitted over a network such as the internet or over a communication line such as a telephone line, and in this case, they may include those that hold the programs for a certain period of time, such as volatile memories inside a computer system used as a server or a client. Additionally, these programs may be for the purpose of realizing some of the aforementioned constituent elements, and furthermore, the aforementioned constituent elements may be able to be realized by being combined with programs that are already recorded in the computer system, or may be realized by using hardware such as PLDs (Programmable Logic Devices) or FPGAs (Field Programmable Gate Arrays).

As described above, embodiments of the present invention have been explained in detail by referring to the drawings, but the specific structures are not limited to those in these embodiments, and designs and the like within a range not departing from the gist of the present invention are included.

INDUSTRIAL APPLICABILITY

The present invention is applicable, for example, to radio communications. With the present invention, it is possible to reduce the transmission data volume between multiple RRHs and a BBU.

DESCRIPTION OF REFERENCE SYMBOLS 10, 10d, 10e, 10f, 10g, 10l, 10m, 10n, 10o, 91, 91a . . . terminal apparatus
20 (20-1, 20-2), 20a (20a-1, 20a-2) to 20o (20o-1, 20o-2), 92-1, 92-2, 92a-1, 92a-2 . . . RRH
30, 30a, 30b, 30c, 30h, 30j, 30k, 93, 93a . . . BBU
201-1, 201-2, 201-1-1 to 201-1-n, 201-2-1 to 201-2-n, 921-1, 921-2, 921a-1, 921a-2 . . . RF reception unit
202 (202-1, 202-2), 202a (202a-1, 202a-2), 202d (202d-1, 202d-2), 202e (202e-1, 202e-2), 202f (202f-1, 202f-2), 202g (202g-1, 202g-2), 202i (202i-1, 202i-2), 202l (202l-1, 202l-2), 202m (202m-1, 202m-2), 202n (202n-1, 202n-2), 202o (202o-1, 202o-2), 922-1, 922-2, 922a-1, 922a-2 . . . channel estimation unit
203-1, 203-2, 203h-1, 203h-2, 923-1, 923-2, 923a-1, 923a-2 . . . demodulation unit
204-1, 204-2, 924-1, 924-2 . . . decoding unit
205 (205-1, 205-2), 205a (205a-1, 205a-2), 205b (205b-1, 205b-2), 205c (205c-1, 205c-2), 205h (205h-1, 205h-2), 205i (205i-1, 205i-2), 205j (205j-1, 205j-2), 205k (205k-1, 205k-2) . . . transmission control unit
301, 301a, 301b, 301c . . . selective combining unit
302, 302j, 302k, 932 . . . LLR combining unit
303, 933 . . . decoding unit

The invention claimed is:

1. A radio apparatus in a radio communication system that comprises the radio apparatus and a signal processing apparatus that function as a base station,
the radio apparatus comprising:
a channel estimation unit that, on the basis of a radio signal transmitted from a terminal apparatus, measures a reception quality of the radio signal; and
a transmission control unit that, on the basis of the reception quality measured by the channel estimation unit, controls transmission, to the signal processing apparatus, of bit data or a log likelihood ratio obtained from the radio signal,
wherein, when the reception quality is less than a predetermined threshold value, the transmission control unit discards the bit data or the log likelihood ratio without transmission to the signal processing apparatus, and notifies the signal processing apparatus that the bit data or the log likelihood ratio will not be transmitted to the signal processing apparatus.

2. The radio apparatus according to claim 1, wherein the channel estimation unit measures, as the reception quality, any one of a received signal power, a received SNR (Signal to Noise Ratio), and a received SINR (Signal to Interference plus Noise Ratio).

3. A radio communication method performed by a radio apparatus in a radio communication system that comprises the radio apparatus and a signal processing apparatus that function as a base station, the radio communication method comprising:
a channel estimation step of measuring, on the basis of a radio signal transmitted from a terminal apparatus, a reception quality of the radio signal; and
a transmission control step of controlling, on the basis of the reception quality measured in the channel estimation step, transmission, to the signal processing apparatus, of bit data or a log likelihood ratio obtained from the radio signal,
wherein, when the reception quality is less than a predetermined threshold value, the transmission control step discards the bit data or the log likelihood ratio without transmission to the signal processing apparatus, and notifies the signal processing apparatus that the bit data or the log likelihood ratio will not be transmitted to the signal processing apparatus.

* * * * *